INVENTOR.
Joseph B. Armitage.
BY
Elroy J Wutschel
Attorney

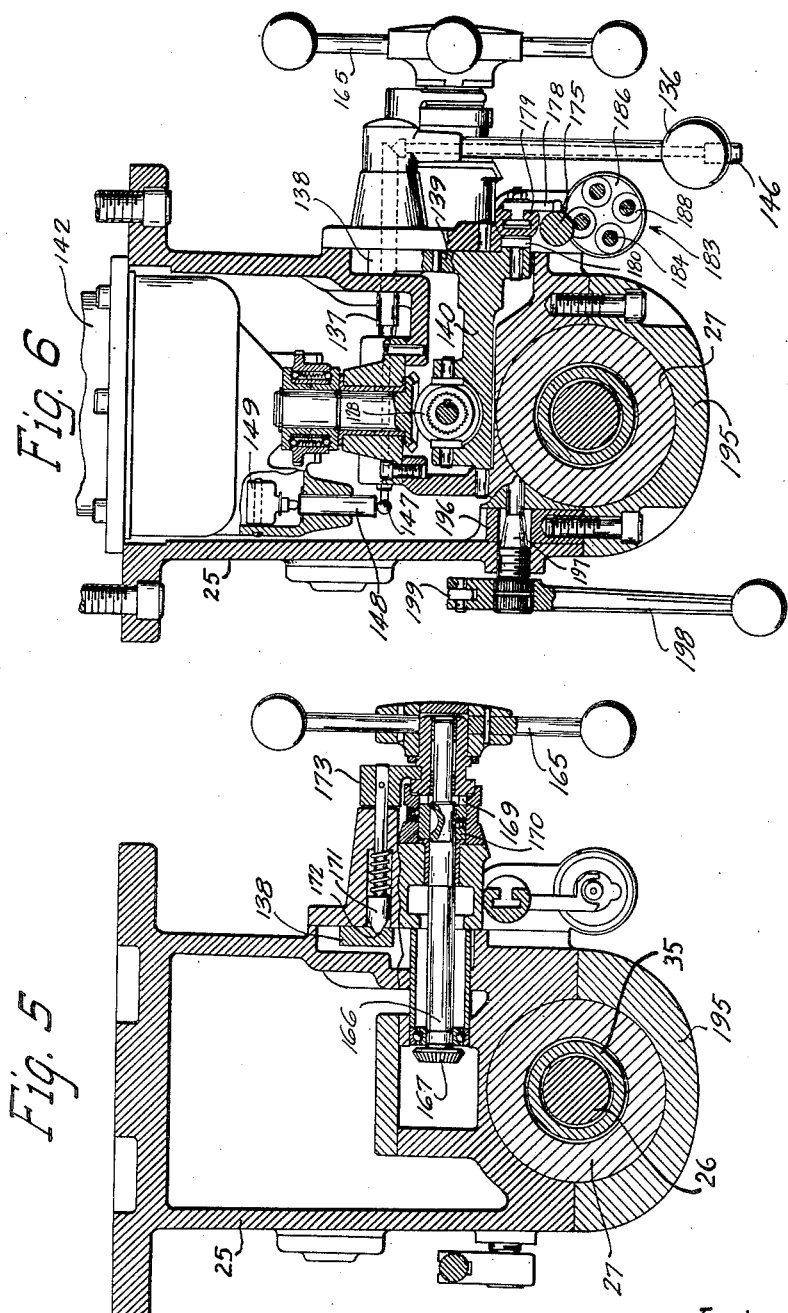

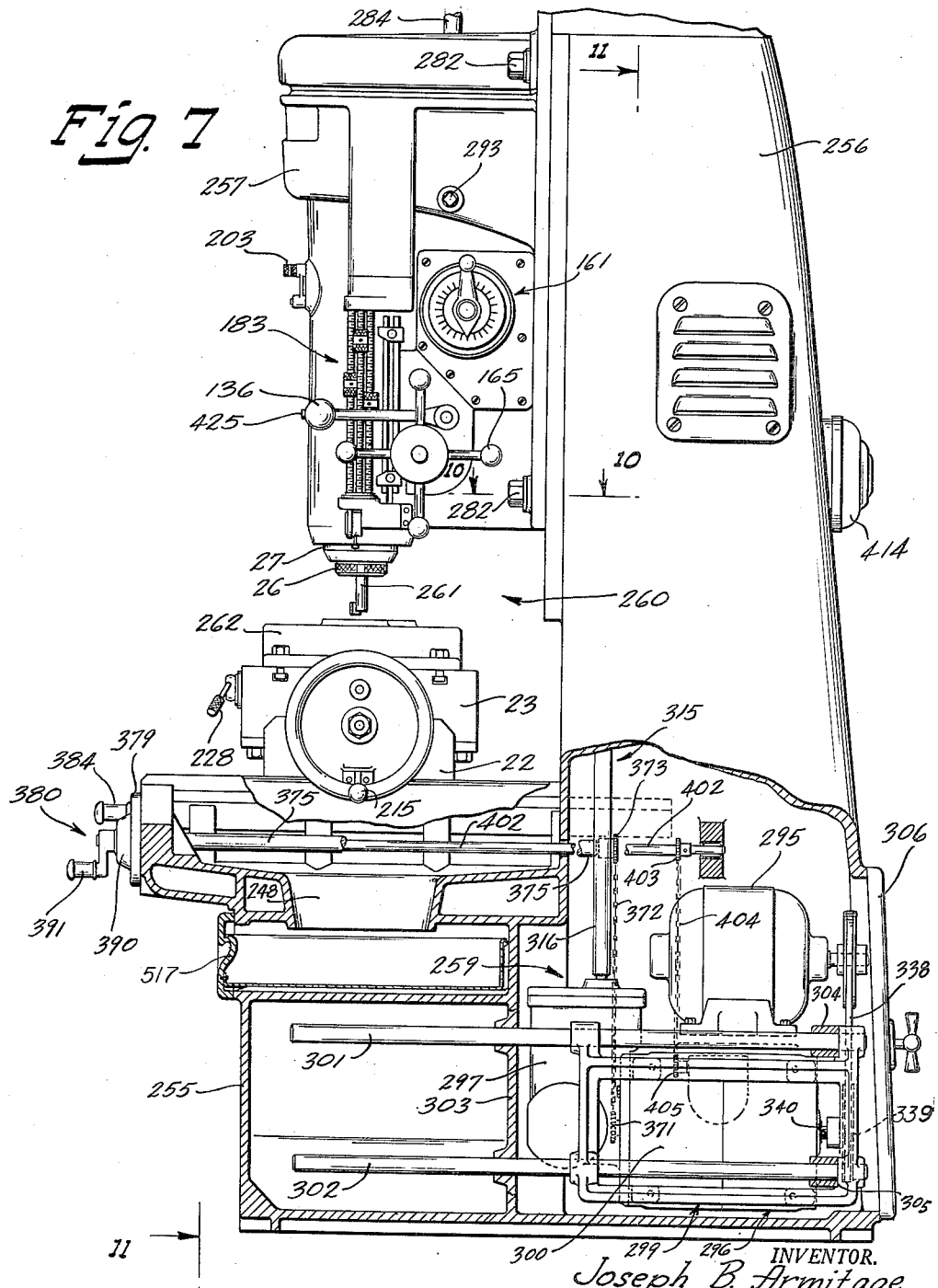

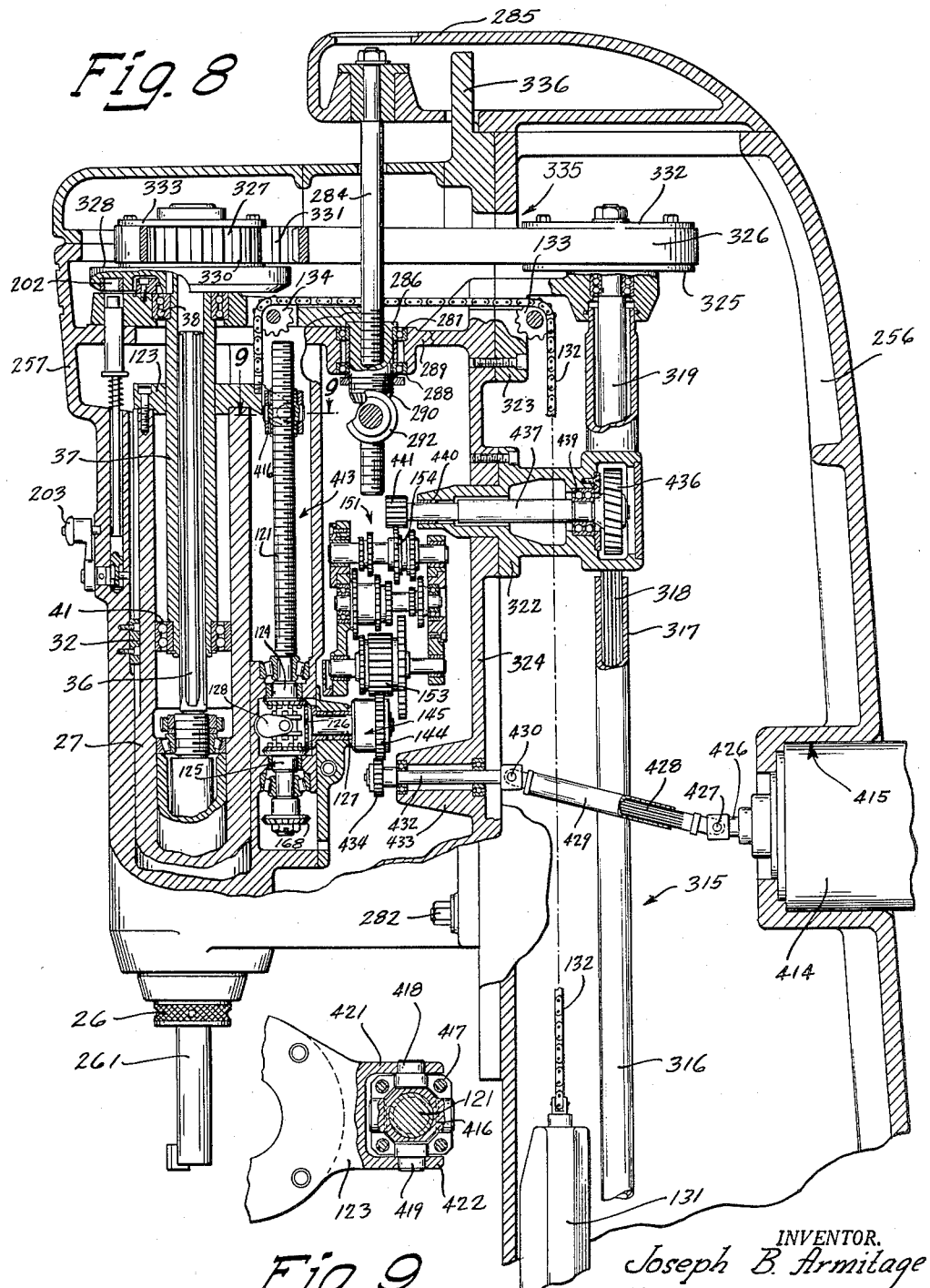

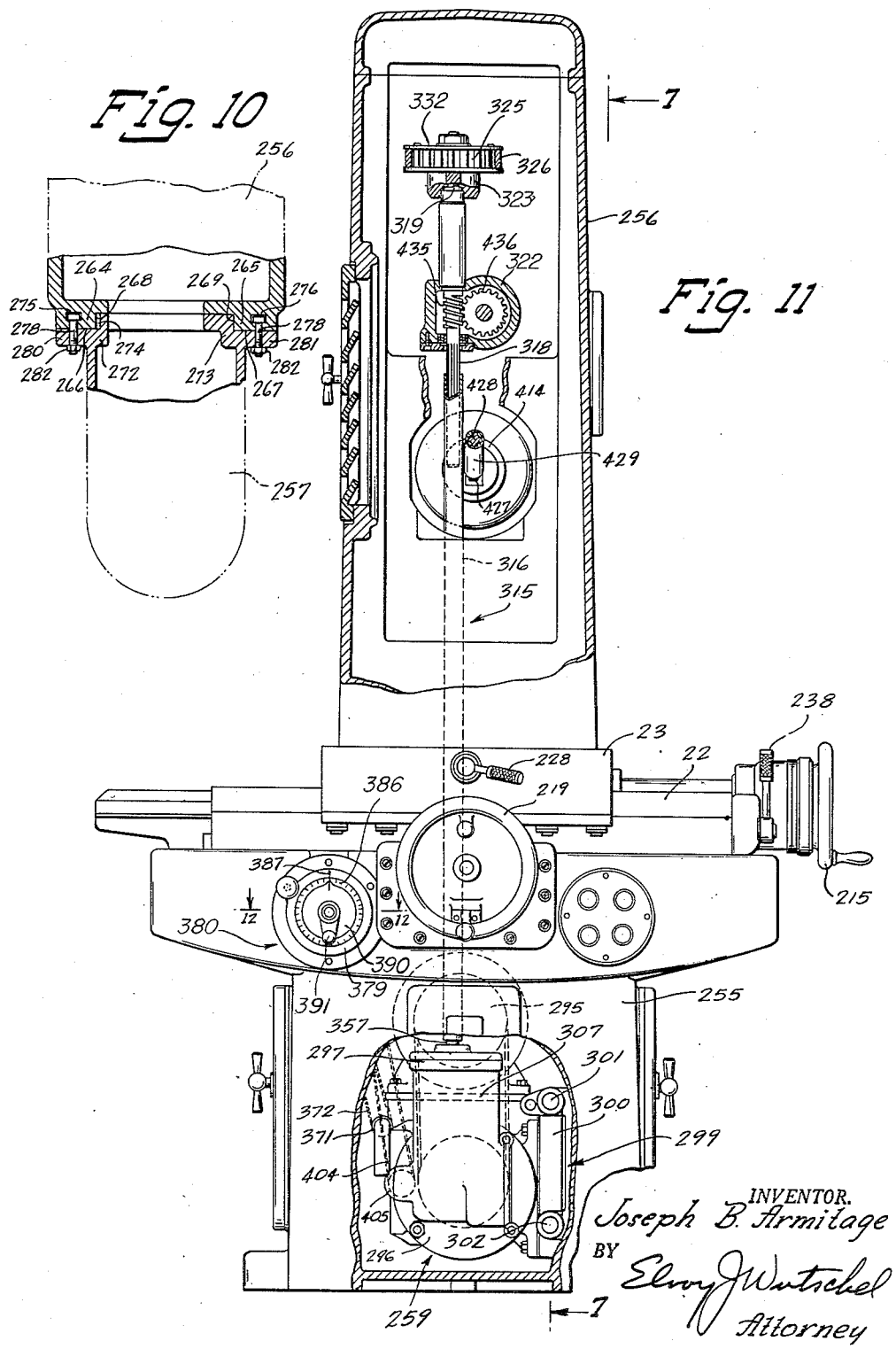

June 29, 1954  J. B. ARMITAGE  2,682,182
MACHINE TOOL
Filed Oct. 21, 1950  13 Sheets-Sheet 10

INVENTOR
Joseph B. Armitage
BY
Elroy J. Wutichel
ATTORNEY

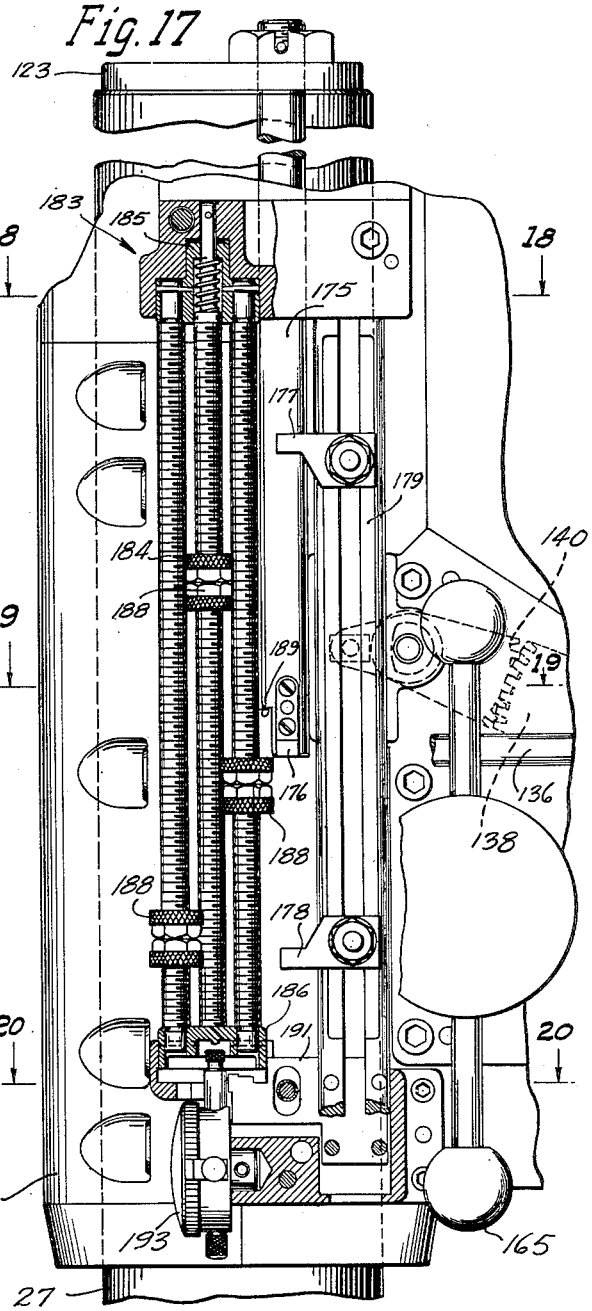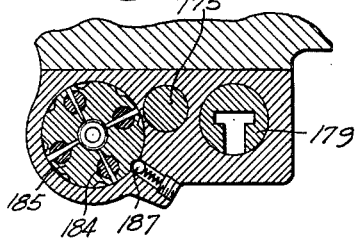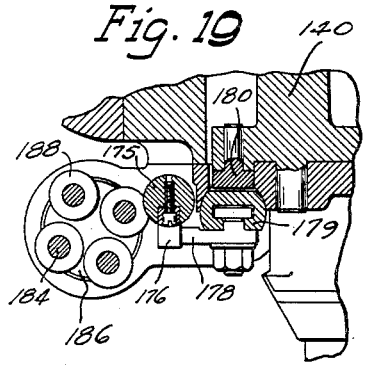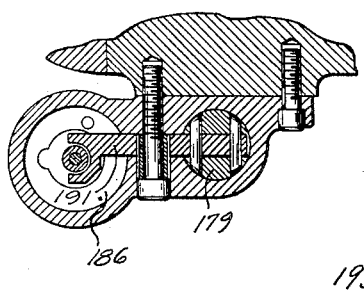
June 29, 1954 — J. B. ARMITAGE — 2,682,182
MACHINE TOOL
Filed Oct. 21, 1950 — 13 Sheets-Sheet 13
Inventor
Joseph B. Armitage
By Elroy J. Wutschel
Attorney Patented June 29, 1954

2,682,182

UNITED STATES PATENT OFFICE 2,682,182

MACHINE TOOL

Joseph B. Armitage, Wauwatosa, Wis., assignor to Kearney & Trecker Corporation, West Allis, Wis., a corporation of Wisconsin Application October 21, 1950, Serial No. 191,462

53 Claims. (Cl. 77—5)

The present application is a continuation-in-part of my pending application entitled, Machine Tools, Serial No. 610,593, filed August 13, 1945.

This invention relates generally to machine tools and more particularly to an improved precision boring machine.

A general object of the invention is to provide an improved machine tool of the precision jig boring type.

Another object of the invention is to provide an improved power transmitting mechanism for actuating movable elements of a machine tool.

Another object is to provide in a machine tool, an improved transmission mechanism including fixed step and infinitely variable speed changing apparatus operating in combination.

Another object is to provide an improved selectively movable supporting head for the independently movable spindle carrying quill of a machine tool.

Another object is to provide an improved cooperative speed controlling and indicating apparatus for a combined fixed step and infinitely variable speed changing mechanism.

Another object is to provide an improved telescoping power transmitting mechanism for actuating a movable tool supporting member of a machine tool.

Another object is to provide an improved arrangement for adjusting the tension of a driving belt in a machine tool power transmission mechanism.

Another object is to provide an improved spindle supporting quill mechanism for a machine tool.

Another object is to provide an improved combined power source and variable speed transmission mechanism arranged to constitute a unitary driving apparatus for the movable elements of a machine tool.

Another object is to provide improved actuating and controlling mechanism for moving a machine tool operating member.

Another object is to provide an improved driving mechanism for a machine tool that comprises a resilient drive, an infinitely variable speed changer in combination with a fixed step range changer, and a second resilient drive interconnected in series between a power source and a tool spindle in manner to absorb shock loads in transmitting power therebetween and for driving the tool spindle with a minimum of vibration during a cutting operation.

Another object is to provide an improved combined speed indicating and controlling apparatus for selectively adjusting the variable speed transmission mechanism of a machine tool.

Another object is to provide an improved self-aligning elevating mechanism for effecting selective adjustment of a movable member of a machine tool.

Another object is to provide an improved mounting arrangement for a unitary main driving mechanism for a machine tool that is especially adapted to provide convenient access to the constituent units comprising the mechanism in the event it is necessary to inspect or adjust one or another of the units.

A further object is to provide improved locking means and clamping mechanism for retaining movable members of a machine tool in desired position.

A further object is to provide an improved chip receiving arrangement for a machine tool.

A still further object is to provide improved precision positioning apparatus for a movable element of a machine tool.

According to this invention, a precision boring machine of the vertical spindle type is provided with improved supporting and driving mechanism, including speed changing apparatus constituted by a fixed step gear shifting mechanism and an infinitely variable belt drive mechanism functioning cooperatively under the control of a unitary speed adjusting and indicating device. Power is transmitted from the fixed step mechanism to the vertical spindle by belts and pulleys, the fixed step mechanism being movably mounted in the machine frame to provide for adjustment of the spindle driving belts. The speed adjusting and indicating device is connected to the speed changing apparatus by control linkage arranged to accommodate movement of the transmission and to provide for movement of the expansible pulleys of the infinitely variable belt drive. The tool spindle is journalled in an improved axially adjustable hollow quill into which a driving shaft extends from the pulley and has splined connection with a portion of the spindle. Feeding movement of the spindle is effected through rate changing mechanism driven by means of an extensible connection from the movable spindle driving transmission mechanism. A separate motor is provided for effecting rapid traverse movement, the motor being controlled by a push button on the reversing lever. An improved multiple stop and position indicating apparatus is provided for controlling precise feeding movements of the spindle. The spindle may be clamped in adjusted position by operation of an improved clamping device. Improved clamps are likewise provided for holding the saddle and table, these elements being adjustable by means of improved precision screw and nut actuating and indicating apparatus.

In a modified form of the invention, there is provided an improved supporting head disposed to be mounted for selective vertical adjustment on the upper forward face of a machine column, and arranged, in turn, to slidably support a spindle carrying quill for independent selective axial adjustment. For driving the tool spindle at a selected rate of speed, as well as for effecting selective power driven movement of the axially movable quill at a proportionate feeding rate, there is provided an improved combined unitary power source and infinitely adjustable speed changing transmission mechanism removably mounted within the hollow base of the machine. In order that the spindle quill may be operated with the utmost accuracy as a cutter is advanced toward a workpiece in performing a metal cutting operation, an improved elevating apparatus comprising a self-aligning screw and nut mechanism is operatively connected to effect selective axial movement of the quill within its supporting head.

In each embodiment of the invention, the spindle driving transmission mechanism is particularly adapted to drive the tool spindle with a minimum of vibration as well as to afford protection to the speed changing mechanism in the event of sudden shock loads that might be imposed by complete, even though momentary, cessation in the rotation of the tool spindle. To this end, one resilient power transmitting driving connection is interposed between the driving motor and the speed changing mechanism, and a second resilient driving connection is interposed between the speed changing mechanism and the tool spindle for the primary purpose of minimizing vibration and cushioning the entire power transmitting mechanism against sudden shock loads.

The foregoing and other objects of this invention will become more fully apparent upon consideration of the manner in which they may be achieved by means of the exemplary apparatus illustrated in and hereinafter described in connection with the accompanying drawings, in which:

Fig. 5 is a horizontal sectional view through the spindle head, taken on the plane represented by the lines 5—5 in Figs. 1, 2 and 4;

Fig. 6 is another view in horizontal section through the spindle head, taken on the plane represented by the lines 6—6 in Figs. 1, 2 and 4;

Fig. 7 is a view in right side elevation of a modified form of a vertical spindle, precision boring machine with the lower portion of the column and base broken away to show an improved combined power source and variable speed transmission mechanism, taken along the line 7—7 of Fig. 11;

Fig. 8 is an enlarged view in vertical section through the vertically movable spindle head and the upper part of the supporting column of the modified form of boring machine shown in Fig. 7;

Fig. 9 is a fragmentary view in horizontal section through the self-aligning elevating screw nut and its cooperating elevating screw, taken along the line 9—9 in Fig. 8;

Fig. 10 is a fragmentary plan view of the column and the relatively movable spindle supporting head of the modified form of boring machine, taken partly in horizontal section through the cooperative guiding ways along the line 10—10 of Fig. 7;

Fig. 11 is a view partly in front elevation, partly in transverse vertical section through the upper portion of the column, and, partly in vertical section through the base of the modified form of boring machine, taken along the line 11—11 of Fig. 7;

Fig. 17 is an enlarged fragmentary view of the spindle stop mechanism on the right side of the spindle head, as shown in Fig. 2;

Fig. 18 is a detail view of the stop mechanism in horizontal section, taken on the plane represented by the line 18—18 in Fig. 17;

Fig. 19 is another detail view in horizontal section, taken on the plane represented by the line 19—19 in Fig. 17; and Fig. 20 is a further detail view in horizontal section, taken on the plane represented by the line 20—20 in Fig. 17.

The particular machine tool herein set forth to illustrate a practical embodiment of the various features of this invention, is a precision jig boring machine of the vertical spindle type.

Figure 1:
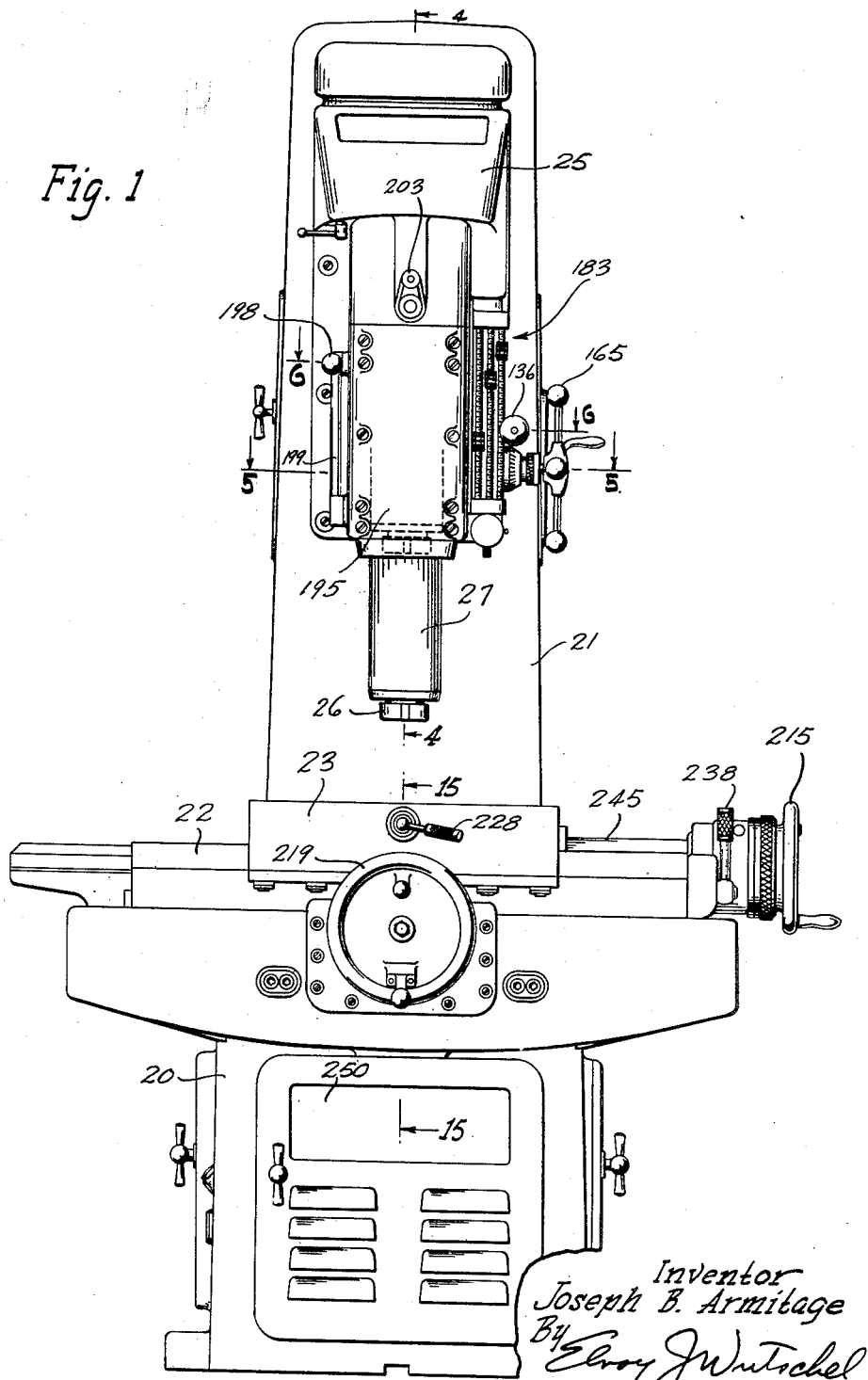
Figure 1 is a view in front elevation of a vertical spindle, precision boring machine embodying some of the principal features of the present invention.
Figure 2:
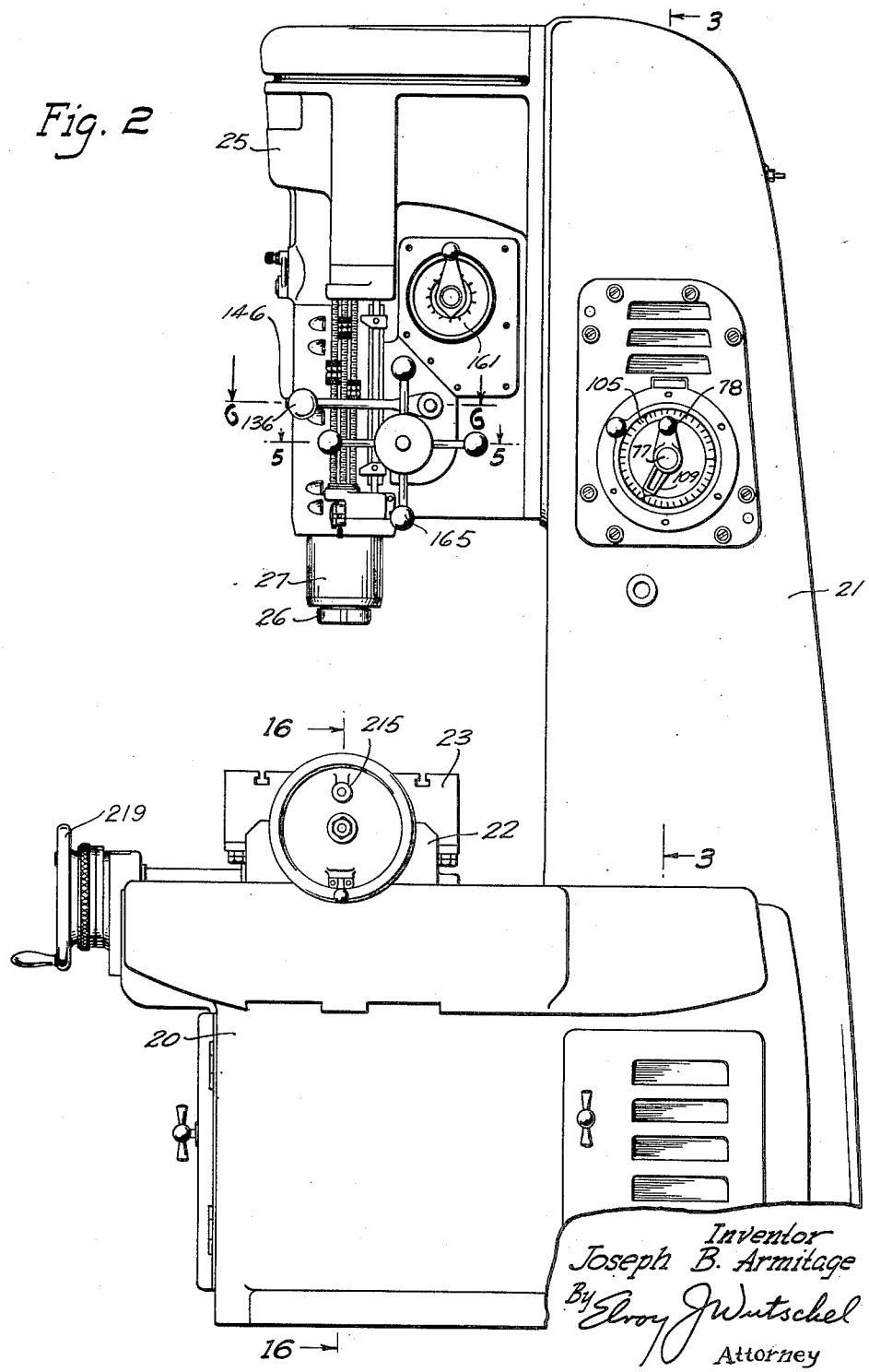
Fig. 2 is a view in right side elevation of the boring machine shown in Fig. 1.

Referring more specifically to the drawing and particularly to Figs. 1 and 2 thereof, the boring machine comprises essentially a hollow base or bed 20 carrying an integrally formed upstanding hollow column 21, the combined structure constituting the frame of the machine and the housing for the driving mechanism. As shown, the base 20 projects forwardly from the column 21 and has slidably mounted on its upper surface a saddle 22 that carries a movable work supporting table 23, the arrangement being such that the saddle may be moved toward or from the column and the table moved along the saddle at right angles to its path of movement.

At its upper end, the column 21 is provided with a forwardly projecting spindle head 25 that overlies the base 20 and carries a vertically positioned tool spindle 26 in cooperating relationship with the work supporting table 23.

Figure 4:
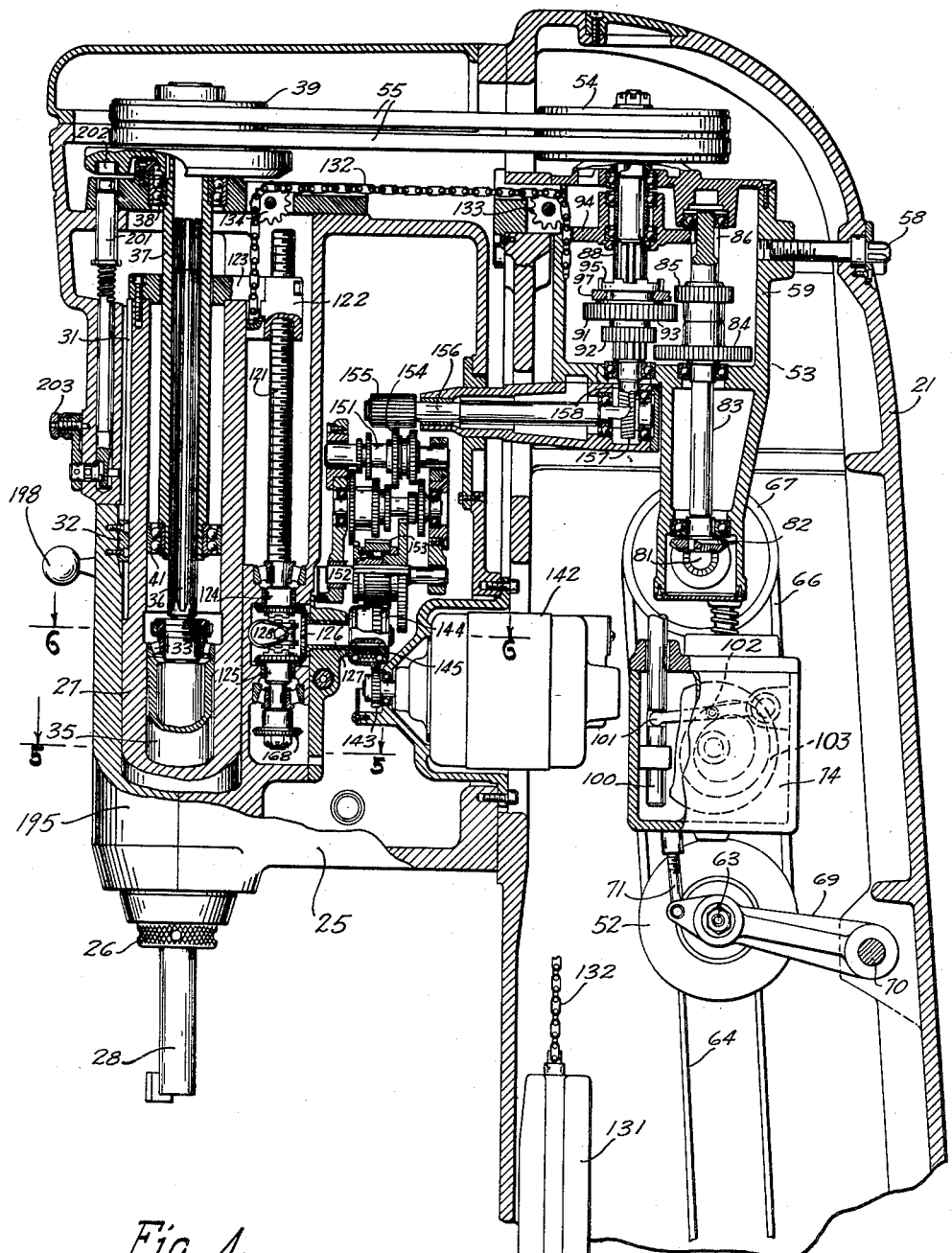
Fig. 4 is an enlarged view in vertical section through the head and the upper part of the column of the machine, taken on the plane represented by the line 4—4 in Fig. 1.

As best shown in Figs. 4, 5 and 6, the tool spindle 26 is rotatably mounted in a spindle quill 27 that is slidably mounted in the spindle head 25 for axial movement therein to effect feeding of a cutter 28 carried by the spindle relative to a workpiece that may be mounted on the table 23. The quill 27 is essentially a hollow cylindrical member fitted in a complementary bore in the head 25 and provided with a longitudinal keyway 31, which engages a key 32 fixed in the head to prevent the quill from turning. The spindle 26 is journalled in the lower portion of the quill in a pair of antifriction bearings, of which the upper bearing 33 is shown, which are separated by a spacing member 35. Above the upper bearing 33, the spindle presents a splined portion 36 of reduced diameter that cooperates with an internally splined hollow shaft 37 projecting downwardly from the upper part of the head into the hollow quill.

As shown in Fig. 4, the hollow shaft 37 is rotatably mounted at its upper end in the spindle head by means of a bearing 38, above which the shaft is fitted with a combined driving belt pulley and flywheel 39. The lower end of the hollow shaft 37 is supported by a bearing 41, which fits within the hollow quill 27 and has vertically slidable engagement therewith to provide for relative axial movement, the arrangement being such that the quill 27 and the spindle 26 may have vertical movement relative to the head 25 and the hollow driving shaft 37, without interfering with the driving connection and without requiring that any part of the spindle extend above the driving pulley 39. By this arrangement, driving torque is transmitted by the relatively rigid hollow shaft 37 to a point as near as possible to the tool receiving nose of the spindle. A special arrangement for lubricating the spindle and quill and for withdrawing excess lubricant from the region of the lower spindle bearing is set forth in copending application, Serial No. 579,459, filed February 23, 1945, now Patent No. 2,457,893, granted January 4, 1949.

Figure 3:
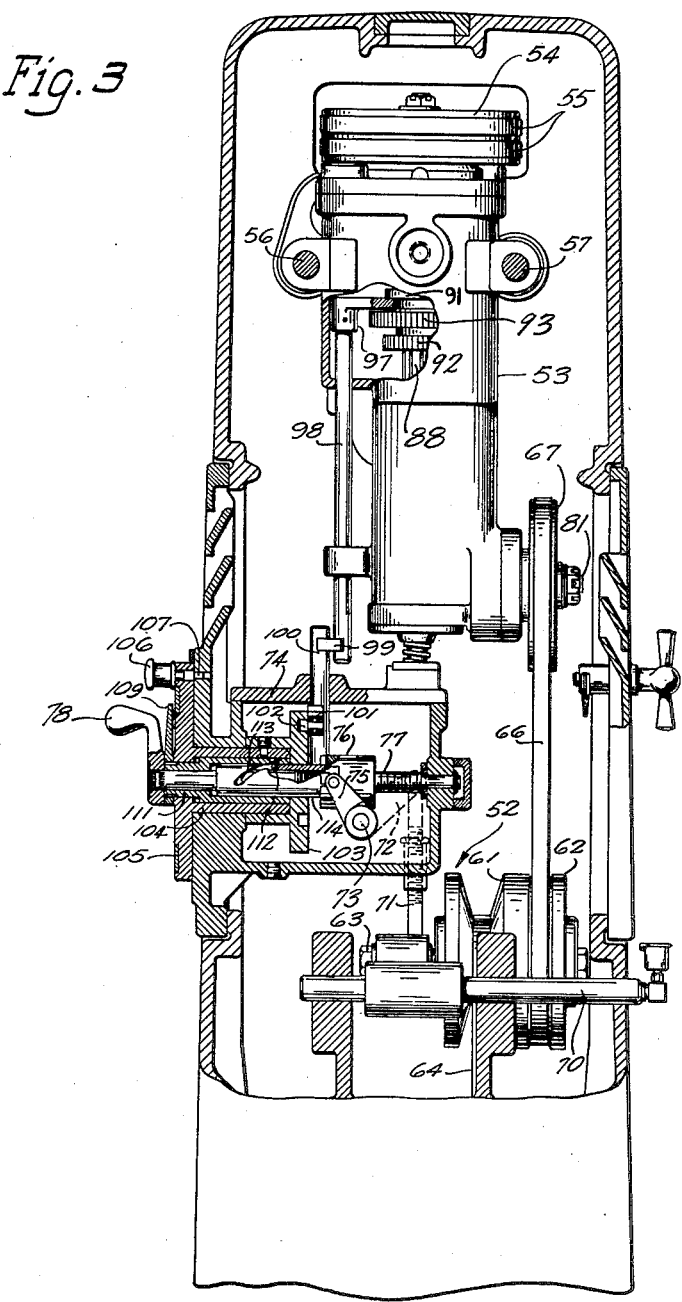
Fig. 3 is a view in vertical section through the column of the machine, taken on the plane represented by the line 3—3 in Fig. 2.
Figure 16:
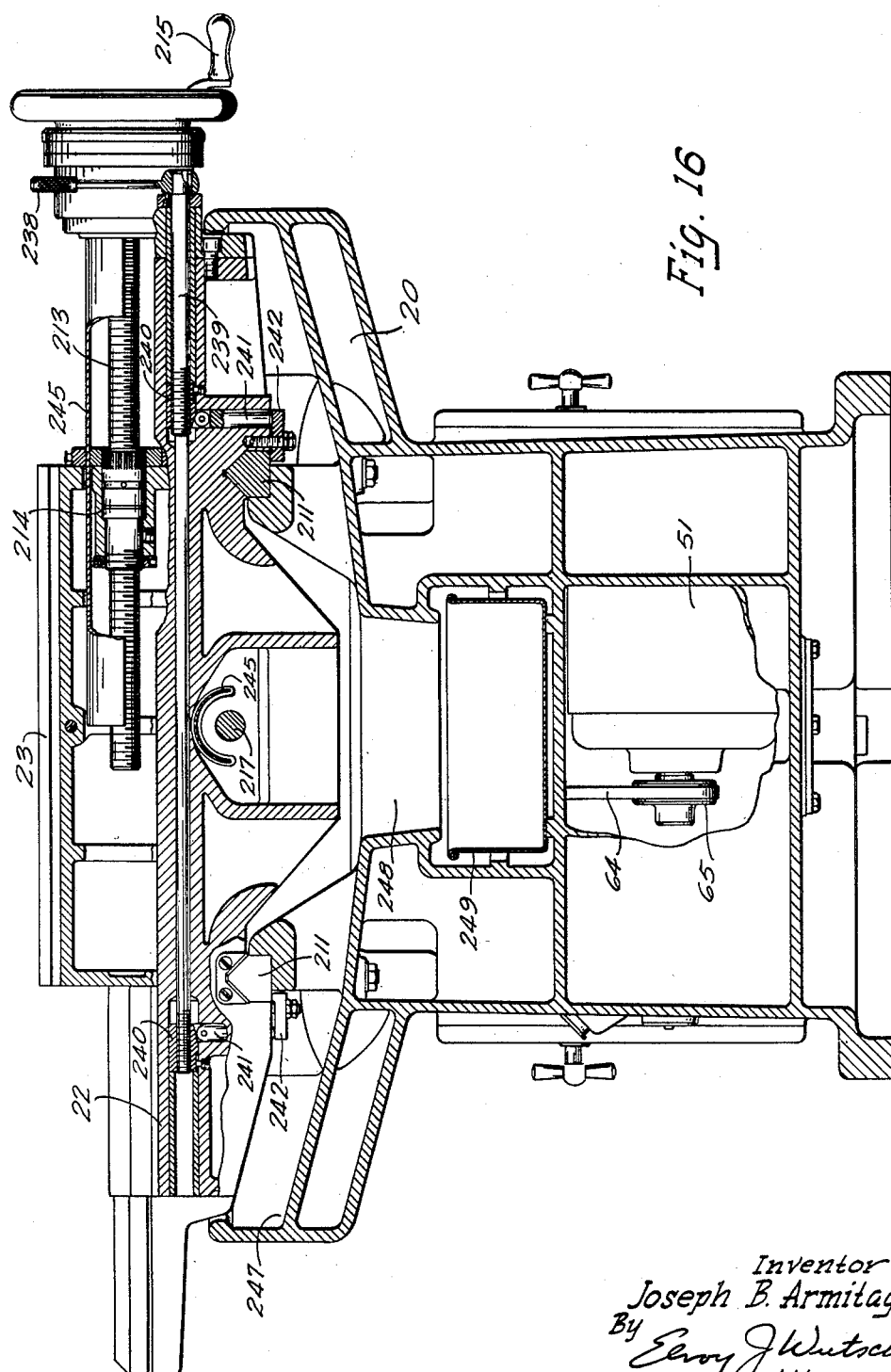
Fig. 16 is a view in vertical section through the machine bed and work supporting table, taken substantially on the plane represented by the line 16—16 in Fig. 2.

Power for driving the spindle 26 and for effecting vertical feeding movement of the quill 27 is derived from an electric motor 51 mounted within the hollow base 29 of the machine, as shown in Fig. 16. From the motor 51, power is transmitted through an infinitely variable belt drive speed changing mechanism 52, as shown in Figs. 3 and 4, to a fixed step range changing mechanism 53 within the upper part of the column 21. The fixed step mechanism 53 is of the shiftable gear type and is provided with a belt driven pulley 54 disposed in driving relationship with the pulley 39 on the spindle 26. A pair of belts 55 operatively interconnect the two pulleys for transmitting power at selected speeds to drive the tool spindle 26.

In order that the tension in the spindle driving belts 55 may be adjusted, the entire fixed step transmission mechanism 53 is arranged for movement toward or away from the spindle within the column 21 in such manner as to vary the center distances between the pulleys 39 and 54. As shown in Figs. 3 and 4, the mechanism 53 is slidably mounted upon a pair of horizontal supporting guide rods 56 and 57, disposed in parallelism with the belts 55 in the upper part of the column. For moving the transmission mechanism 53 along the rods to adjust the belts, there is provided a belt adjusting screw 58 that is rotatably mounted in the rear wall of the column 21 and has threaded engagement with a portion of a housing 59 that encloses the mechanism 53, the screw 58 being provided at its outer end with a squared portion for receiving an actuating instrument. By this arrangement, the belts 55 may be tightened by turning the screw 58 in direction to move the mechanism 53 rearwardly along the supporting rods 56 and 57.

As best shown in Fig. 3, the infinitely variable speed changing transmission mechanism 52 comprises two expansible pulleys 61 and 62 interconnected for rotation as a unit and carried on a movably mounted shaft 63. The expansible pulley 61 is engaged by a belt 64, which also cooperates with and is driven by a rigid pulley 65 on the shaft of the driving motor 51 (see Fig. 16). The other expansible pulley 62 receives a belt 66, which also operates over a rigid pulley 67 carried by and connected to drive the fixed step range changing mechanism 53. The two expansible pulleys 61 and 62 of the speed changer 52 may be expanded and contracted alternately through action of the cooperating belts upon bodily movement of the pulley carrying shaft 63 toward or from the one or the other of the rigid pulleys 65 and 67, respectively. For example, with the shaft 63 in the upper position, shown in the drawing, the pulley 61 operates at a relatively small pitch diameter, while the pulley 62 operates at a large pitch diameter. Consequently, the upper belt 66 will be driven at a speed higher than that of the motor driven belt 64.

To provide for the required bodily adjusting movement of the expansible pulley unit 52, the pulley supporting shaft 63 is carried by a radius arm 69 that is mounted for oscillation about a pivot pin 70, supported by lugs on the rear wall of the column 21, as shown in Fig. 4. For effecting adjusting movement of the expansible pulley unit, the arm 69 is engaged at its free end by an adjustable control rod 71, which extends upward and is connected at its upper end to the end of a crank arm 72 that is mounted on a protruding rocking shaft 73 at the side of a speed control box 74 fitted in the right side of the column 21, as shown in Fig. 3.

Another crank arm 75, mounted on the rocking shaft 73 within the control box 74, engages a traveling nut 76 that has threaded engagement with a control screw shaft 77. The control shaft 77 extends longitudinally through the box 74 and projects from it at the right side of the machine. As shown in Figs. 2 and 3, the control shaft 77 is provided on its exposed outer end with a control crank handle 78, by means of which it may be rotated. When the handle 78 is turned, the threaded shaft 77 causes longitudinal movement of the nut 76 which, in turn, causes rocking movement of the crank arms 75 and 72, to raise or lower the variable belt drive mechanism shaft 63, thereby varying the driving ratio by infinitesimal steps, as may be required to obtain the desired spindle speed.

The pulley 67, driven by the belt 66 from the infinitely variable speed mechanism 52, is carried on the outer end of a shaft 81, journalled in the housing 59 of the fixed step transmission mechanism 53. As shown in Fig. 4, the shaft 81 is connected, through bevel gearing 82 within the housing 59, to drive a vertically disposed primary shaft 83 of the fixed step mechansim. The shaft 83 has fixed to it, within the housing 59, three gear wheels 84, 85 and 86 of different diameters, for driving a parallel secondary shaft 88 at one of three selected speed ratios.

As shown, the secondary shaft 88 projects upwardly from the casing 59 and carries on its exposed upper end the spindled driving belt pulley 54. Within the casing 59, the shaft 88 has splined connection with a gear couplet 91, comprising gears 92 and 93, complementary to and adapted to mesh selectively with the gears 84 and 85, respectively, on shaft 83, to effect either of two driving ratios. A third gear 94 is rotatably mounted on the shaft 88 in constant meshing relationship with the third gear 86 on the primary shaft 83, the couplet 91 being provided with jaw clutch teeth 95 for engaging complementary teeth on the hub of the gear 94 to effect a selective driving connection between it and the shaft 88 for effecting the third driving ratio when both the gears 92 and 93 are out of mesh with their respective driving gears.

For positioning the gear couplet 91 to select the desired fixed step speed ratio, the couplet is engaged by a shifting yoke 97 mounted on the upper end of a vertically disposed shifting rod 98, ash shown in Fig. 3. The lower end of the rod 98 is operatively connected by a tongue and groove sliding connector 99 with the upper end of an actuating shaft 100, which projects upwardly from the control box 74, the arrangement being such that vertical movement may be transmitted from the shaft 100 to the shaft 98, regardless of horizontal movement of the fixed step mechanism 53 in adjusting the tension of the driving belts 55.

Within the control box 74, the shaft 100 is connected with a pivotally mounted actuating arm 101 carrying a cam follower 102, which engages a cam groove in a cam plate 103, rotatably mounted concentric with the control shaft 77. As shown, the cam plate 103 is fixed to a sleeve 104 that projects from the side of the machine and carries on its outer end a speed indicating dial plate 105 and an actuating crank handle 106. The crank handle 106 is fitted with a latching pin 107 which, when withdrawn from a cooperating latching opening in the face of the box 74, permits the crank and the dial 105 to be turned to a new position in which another latching opening is engaged by the pin 107. This results in turning the cam plate 103 and effecting vertical movement of the actuating rod 100 and the shifting rod 98 to shift the gear couplet 91 for effecting a different driving connection between the shafts 83 and 88.

Three latching openings are provided for positioning the indicating dial 105 in the three positions corresponding with the three fixed step speed ratio positions of the gear couplet 91, a fourth latching opening being provided for latching the dial with the couplet 91 in a neutral position, such as shown in Fig. 4, in which the gears 92 and 93 and the clutch teeth 95 are all out of mesh with their cooperating driving members.

For indicating the speed of the spindle 26, the dial 105 carries speed indicia divided into three segments corresponding, respectively, with the speed ranges provided by the three gear ratios of the fixed step driving mechanism 53. For indicating the speed on the dial 105, there is provided a speed pointer 109, which ranges over the active segment of the dial in accordance with the setting of the infinitely variable belt drive mechanism 52. As shown in Fig. 3, the pointer 109 is carried on the outer end of a sleeve 111, disposed to rotate within the hollow sleeve 104 of the dial 105 and concentrically with the screw shaft 77.

The sleeve 111 is provided with an inwardly projecting cam follower 112, which engages a spiral cam groove 113 formed in a sleeve 114 directly connected to be rotated by the traveling nut 76. As is readily apparent, when the speed adjusting crank 78 is turned to move the nut 76 along the screw 77 in adjusting the infinitely variable speed changing mechanism 52, the cam groove 113 operates upon the cam follower 112, fixed on the sleeve 111, in manner to cause the sleeve and the associated pointer 109, to rotate relative to the box 74. By this arrangement, the pointer 109 is caused to turn in accordance with adjustment of the variable speed belt driving mechanism 52 and cooperates with the active segment of the dial 105 corresponding with the fixed step ratio established by adjustment of the transmission mechanism 53 through positioning of the range change actuating crank 106.

The spindle carrying quill 27 is arranged for vertical feeding movement either manually or by power through operation of a vertically disposed feed screw 121 that is rotatably mounted in the head 25 in parallel relationship with the quill, as best shown in Fig. 4. The screw 121 cooperates with a nut 122 that is carried by a cap 123 fastened to the upper end of the quill 27. Power operation of the screw 121 in selected direction is effected by means of a reversing mechanism, including a pair of opposed bevel gears 124 and 125 mounted for rotation concentrically with the screw and both having meshing engagement with an interconnecting driving bevel gear 126 mounted on a horizontal stub shaft 127 journalled in the head 25. The reversing gears 124 and 125 may be coupled to the screw 121 selectively by means of a shiftable clutch collar 128 that is slidably splined on the screw shaft between the gears for movement into engagement with either of them. To facilitate movement of the quill 27, its weight is counterbalanced by means of a counterweight 131 that is suspended within the hollow column 21 by a chain 132, which operates over idler sprockets 133 and 134 in the upper part of the column and head, and is connected to the quill cap 123 in manner to exert force upwardly upon it to counterbalance the weight of the quill and spindle.

Shifting of the clutch collar 128 is effected by operating a feed lever 136 mounted on the right side of the head 25 on the protruding end of a shaft 137 journalled transversely of the head, as shown in Fig. 6. The shaft 137 carries a gear segment 138, which meshes with a complementary gear segment 139 on a reversing yoke 140 that is pivotally mounted in the head parallel with the shaft 137 in position to engage and operate the reversing clutch collar 128, the arrangement being such that, when the lever 136 is pivoted upward or downward, it moves the clutch collar in manner to effect power driven movement of the quill 27 in corresponding direction.

Movement of the quill by power at rapid traverse rate is effected through operation of a separate motor 142 mounted horizontally in the head 25 (as shown in Figs. 4 and 6) and provided with a pinion 143, which meshes with a gear 144 that is connected to the stub shaft 127 by means of an overload release or safety clutch 145. For energizing the motor 142 to effect rapid traverse movement, the reversing feed lever 136 is provided at its outer enlarged end with a push button 146, which operates mechanical linkage extending through the lever 136 and the shaft 137 to move an actuating element 147 projecting from the end of the shaft 137 in manner to operate upon a switch plunger 148 for closing a switch 149 that is electrically connected in well known manner to effect energization of the motor 142.

Power feeding movement of the quill 27 at selected feed rate is effected by operation of a feed rate selecting gear changing mechanism 151 mounted in the head 25 and operating through an overrunning clutch 152 to drive a gear 153, which meshes with the gear 144 on the stub shaft 127 connected with the reversing mechanism. Power is transmitted to the rate changing mechanism 151 through an input gear 154, which has meshing engagement with a relatively long pinion 155 driven by the fixed step range changing mechanism 53. As best shown in Fig. 4, the long pinion 155 is mounted on the extended end of a shaft 156 journalled in a projecting portion of the speed changer housing 59, the arrangement being such that when the housing is moved to adjust the tension in the belts 55, the long pinion 155 slides longitudinally relative to the input gear 154, while maintaining driving connection with it. At its other end, the shaft 156 is provided with a worm wheel 157 that meshes with and is driven by a worm 158 on the lower end of the secondary shaft 88 of the fixed step speed changer.

Adjustment of the rate changing mechanism 151 is effected in well known manner by operation of a rate changing and indicating mechanism 161 mounted on the right side of the head 25, as shown in Fig. 2. Since the rate changer 151 is driven by the secondary shaft 88, which also drives the spindle 26, the rate of feeding movement effected by the rate changer is directly proportional to the speed of rotation of the spindle 26.

When the machine is in operation, the desired spindle speed and rate of feeding movement are established by the respective adjusting and indicating mechanisms and the direction of feeding movement is selected by moving the feed lever 136 up or down to engage one or the other of the gears 124 and 125 of the reversing mechanism. Since the rate changing mechanism 151 drives the reverse mechanism through the overrunning clutch 152, if it is desired to move the quill 27 rapidly while the feed is engaged, to advance the cutter 28 to the work, for example, it is merely necessary to depress the rapid traverse button 146 on the feed lever to energize the motor 142 for driving the stub shaft 127 and reverser at rapid rate with the clutch 152 overrunning. When the quill 27 has been moved a sufficient distance at rapid traverse rate, the button 146 may be released to deenergize the motor 142, whereupon the rate changer 151 will again pick up the driving action through the overrunning clutch 152 to resume feeding movement in the same direction, incidentally turning the shaft of the motor 142 at moderate speed.

Movement of the quill 27 may be effected manually through actuation of a feed hand wheel 165 mounted on the right side of the head 25, as shown in Figs. 1, 2, 5 and 6. Referring now to Fig. 5, the hand wheel 165 is carried on the outer end of a horizontal shaft 166 journalled in the head 25 and that has fixed to its inner end a bevel pinion 167, which meshes with a complementary bevel pinion 168 on the lower end of the feed screw 121, as shown in Fig. 4. The hand wheel 165 is rotatably and slidably mounted on the shaft 166 and is provided with positive clutch teeth 169, which effect a driving connection with complementary teeth on a collar 170 keyed to the shaft when the wheel is in its inner position.

In order to avoid the possibility of the hand wheel 165 being rotated by power, an interlocking arrangement is provided, including a spring-pressed plunger 171 that is adapted to engage a conically shaped recess 172 in the side face of the gear segment 138 when the feeding lever 136 is in the neutral position. When the lever 136 is shifted either up or down to move the reversing clutch collar 128 into engagement with one or the other of the reversing bevel gears 124 or 125, however, the recess 172 is moved out of alignment with the rod 171 in such manner that the rod 171 is forced outwardly, as seen in Fig. 5, and through action of a yoke 173 thereon which engages an annular groove in the hub of the wheel 165, moves the wheel outwardly to disengage the positive clutch 169 and release the wheel from driving connection with the shaft 166.

To facilitate moving the spindle quill 27 to a predetermined position, suitable tripping and indicating mechanism is provided on the right side of the spindle head, as shown in the drawings and more particularly in the enlarged view, Fig. 17. As there shown, a trip rod 175 is disposed vertically along the outer surface of the spindle head 25 and is positively connected within the head to the quill cap 123 for vertical movement in parallel relationship with the quill 27. The trip rod 175 is provided at its lower end with a tripping lug 176 that is adapted to engage either an upper trip dog 177 or a lower trip dog 178, both of which are adjustably mounted on a tripping bar 179 that is slidably mounted on the side of the head 25, parallel with the tripping rod 175. As appears in Figs. 6, 17 and 19, the tripping bar 179 is operatively connected by a tripping shoe 180 to the reversing yoke 140 and functions when either the stop dog 177 or the stop dog 178 is engaged by the lug 176 to pivot the reversing yoke 140 in direction to move the reversing clutch 128 to neutral position.

In operating the machine, the stop dogs 177 and 178 may be positioned as desired to function as limit stops to prevent excessive feeding movement of the quill 27 in either direction. To provide for downward feeding movement of the quill to precisely predetermined selected positions, the machine is fitted with a precision four-position stop mechanism 183. As shown in Figs. 17, 18 and 19, the four-position stop mechanism comprises four threaded rods 184 disposed in parallelism with the tripping rod 175 and mounted at their upper ends in a rotatable barrel 185 journalled in the head and at their lower ends in a generally similar rotatable barrel 186, likewise journalled in the head, the arrangement being such that the barrels may be rotated to bring any one of the four rods into operating relationship with the tripping rod 175. A spring-pressed detent mechanism 187, associated with the upper barrel 185, as shown in Fig. 18, operates to hold the stop mechanism 183 in any one of four rotatably adjusted operating positions or in any one of four intermediate inactive positions.

Each of the threaded rods 184 is provided with a stop nut 188 that may be locked in adjusted position at any point along the length of the rod for engagement by a cooperating abutment 189 at the lower end of the tripping rod 175, as indicated in Figs. 17 and 19. If it is desired to machine four surfaces at different precisely predetermined elevations on a workpiece for example, the four stop nuts 188 may be predeterminately adjusted along their respective screws 184 in manner to cooperate with the abutment 189 on the trip rod 175 for effecting a sequential positioning of the spindle at the required four vertically adjusted positions, respectively. The entire unit 183 may then be turned step by step to bring the several stop nuts 188 into operating position successively. When the spindle quill 27 is being fed downwardly by power to machine one of the surfaces of a workpiece at the predetermined level, the abutment 189 carried by the trip rod 175 is moved downwardly into engagement with whichever one of the stop nuts 188, that happens to be in the operating position. Further downward movement of the quill 27 then operates to move the entire stop mechanism 183 downward, causing the lower barrel 186 to exert force upon a trip yoke 191, which is connected to the lower end of the trip bar 179 and operates to move it downward to disengage the reversing clutch 128, as previously explained, thereby discontinuing the power feeding movement of the quill 27. Precise final positioning of the spindle quill may then be effected by continuing the downward movement through operation of the hand wheel 165, the lower barrel 186 of the stop mechanism 183, meanwhile, moving downward into engagement with the actuating plunger of a precision indicating instrument 193 mounted on the head beneath the barrel. The downward movement may be continued until the indicating instrument 193 indicates arrival of the quill 27 at the precisely determined position. Positioning for the next succeeding cut is then effected by moving the quill 27 upward, which may be done at rapid traverse rate, as previously explained, then turning the stop mechanism 183 to bring the next succeeding one of the stop nuts 188 into operating relationship with the rod 175, whereupon the quill may again be fed downward until stopped and positioned, as previously explained. When it is not desired to use the four-position stop mechanism, it may be turned to one of the intermediate positions in which none of the stop nuts 188 are in operatively aligned relationship with the abutment 189 carried toward the lower portion of the trip rod 175.

The quill 27 is retained in the head 25 by a quill cap 195 secured to the forward face of the head by cap screws. For rigidly clamping the quill 27 in a selected position of vertical adjustment, the quill cap 195 may be drawn tightly against the quill. As shown in Fig. 6, some of the head retaining cap screws engage clamping blocks 196 slidably mounted in the head and presenting apertures which receive tapered clamping plugs 197, that are threaded in the side of the head. As appears in Figs. 1 and 6, there are two clamping plugs spaced vertically on the left side of the head, the upper plug being provided with a clamping lever 198 and the lower plug being connected to the lever by linkage 199. The arrangement of the clamping mechanism is such that when the lever 198 is pulled downward, both of the plugs are screwed into the head and their tapered ends act upon the apertures in the blocks 196 to draw the quill cap 195 into clamping engagement with the quill 27.

For holding the spindle 26 stationary to facilitate mounting or dismounting a tool in the spindle, there is provided a spindle locking arrangement, best shown in Fig. 4. As there shown, a vertically disposed locking plunger 201 is mounted for vertical sliding movement in the head 25 in such manner that its upper end may engage locking recesses 202 in the bottom face of the flywheel integrally formed with the pulley 39 secured to the upper end of the spindle driving shaft 37. An actuating lever 203 pivotally mounted on the front of the head 25 operates through an eccentric mechanism to move the locking plunger 201 up or down for locking or unlocking the tool spindle 26, as required.

Figure 15:
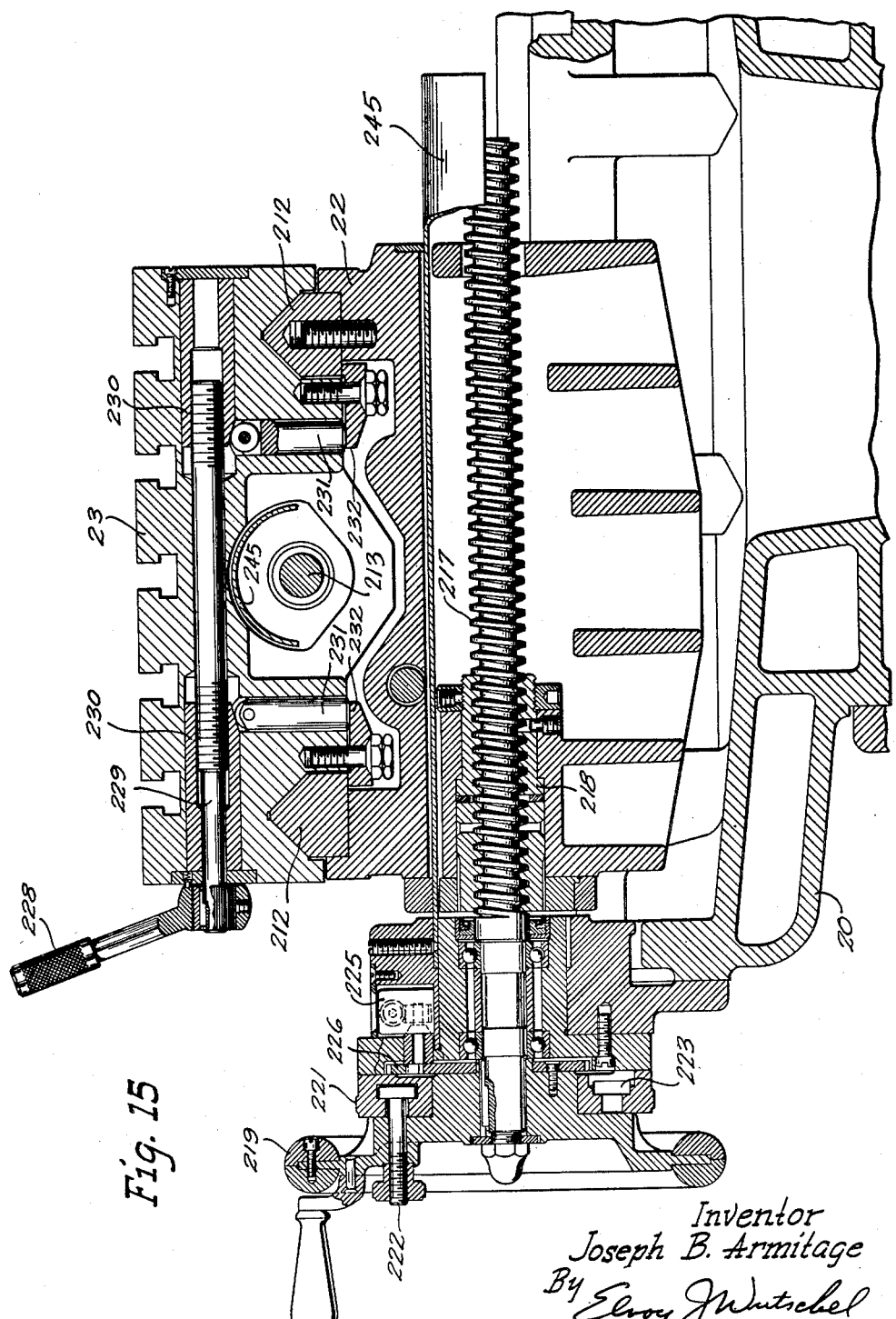
Fig. 15 is an enlarged vertical sectional view through the table, taken on the plane represented by the line 15—15 in Fig. 1.

As best shown in Figs. 15 and 16, the saddle 22 is slidably mounted on the bed 20 by means of spaced V-ways 211 and the table 23 is similarly mounted on the saddle by V-ways 212. The work supporting table may be adjustably positioned along the ways 212 upon the saddle 22 by means of a precision screw 213, which is journalled in the saddle end and has threaded engagement with an adjustable nut 214 mounted in the table, the arrangement being such that lost motion is reduced to a minimum. A crank fitted hand wheel 215 is fixed on the end of the screw 213 for turning it in the usual manner.

As shown in Fig. 15, the saddle 22 is similarly adjusted relative to the bed 20 along the ways 211 by means of a precision screw 217 rotatably mounted in the bed and having threaded engagement with an adjustable nut 218 on the saddle. A crank fitted hand wheel 219 is secured to the outer end of the screw 217 for rotating it. A position indicating dial 221 is adjustably associated with the hand wheel 219, to which it may be clamped in adjusted position by tightening a retaining T-bolt 222 that cooperates with an annular T-slot 223 in the dial. A counting mechanism 225 is associated with each of the screws 213 and 217, being driven by a gear train 226 operatively connected for actuation by the corresponding hand wheel. The arrangement of the counting mechanism and gear train is such that the counting mechanism 225 cooperates with the dial 221 to indicate precisely the position of the movable member through operation of the screw and nut, the action being generally similar to that of a micrometer. Since both the saddle moving screw 217 and the table moving screw 213 are provided with counter and dial position indicating mechanisms, a work-piece on the table 23 may be adjusted relative to the cutting tool 28 in the spindle 26 to any position within the range of the machine with a high degree of precision through direct readings of the dial and counter combination.

After the table 23 has been precisely positioned, it may be clamped to the saddle 22 by actuating a clamping lever 228. As shown in Fig. 15, the lever 228 serves to rotate a shaft 229 having spaced threaded portions which cooperate with a pair of slidably mounted nuts 230. When the lever is moved to clamping position, the nuts are drawn toward each other, causing inclined portions thereof to engage rollers on the upper ends of clamping plungers 231 which, in turn, operate to exert equalized force upon pivotally mounted clamping arms 232, which exert clamping forces against the inner bottom faces of the ways 212 mounted on the saddle 22 in manner to clamp the table rigidly to the ways.

In a generally similar manner, the saddle 22 may be clamped to the bed 20 through operation of a clamping lever 238 at the right end of the saddle, as shown in Fig. 16. This lever is connected to a shaft 239 having spaced threaded portions which engage nuts 240 slidably mounted in the bed for movement toward or away from each other. The nuts 240 act on rollers at the upper ends of clamping plungers 241, which actuate pivotally mounted clamping arms 242 that engage the under sides of the ways 211, which support the saddle on the bed 20. Each of the positioning screws 213 and 217 is protected by a semi-cylindrical guard member 245, which prevents chips or other foreign matter from falling on the screw.

The chips which result from a machining operation fall from the table and saddle into an inwardly sloping chip trough 247 formed on the upper part of the bed 20. As best shown in Fig. 16, the chip trough terminates in a central opening 248, through which the chips descend into a chip receiving pan or container 249 removably positioned within the bed 20 beneath the opening. To dispose of accumulated chips, the pan 249 may be removed from the machine bed upon opening a door 250 at the front of the machine.

In a modified form of the invention, as shown in Figs. 7 and 11, there is provided a boring machine having a hollow base or bed 255 integrally formed with a vertically upstanding hollow column 256 that is arranged to slidably support on its upper forward face a vertically movable spindle supporting head 257. The spindle head 257 projects forwardly from the column 256 in manner to overlie the work supporting table 23 and the saddle 22 that are slidably superimposed on the upper surface of the forwardly extending bed 255 for individual selective movement in mutually transverse horizontal planes. The head 257 is provided with a vertically bored hole arranged to slidably support the spindle carrying quill 27 for selective axial movement in parallelism with and independently of the vertical movement of the head along the column 256. An improved combined unitary power source and variable speed transmission mechanism 259 removably mounted within the rearward portion of the hollow base 255 of the machine is operatively connected to drive the tool spindle 26 journalled in the quill 27, as well as to effect vertical feeding movement of the quill at a selected feeding rate directly proportional to the speed of rotation of the spindle. To more conveniently accommodate different sizes of workpieces and to achieve maximum accuracy in performing a metal cutting operation, there are respectively provided improved elevating means for effecting a selective vertical adjustment of the spindle head 257 and clamping means for immovably securing the head to the column 256 in a selected position of vertical adjustment.

A principal advantage afforded by mounting the spindle head 257 for independent vertical adjustment, as shown in Fig. 7, is the fact that the throat distance 260 formed between the top surface of the table 23 and the under side of the head may be selectively varied to accommodate different sizes of workpieces within the overall operating range of the machine. Thus, with the quill 27 in retracted position, as shown in the drawing, the spindle head 257 may be so positioned that a cutting tool 261 carried by the spindle 26 will just clear the top surface of a workpiece, for example the workpiece 262 mounted on the table 23. This arrangement is particularly advantageous in reducing to a minimum the unsupported length of the quill 27 that will project downwardly from the head 257 as the cutter is fed downwardly in performing a drilling, boring, or a thread cutting operation on a workpiece. By minimizing the unsupported length of the quill 27 extending below the spindle head 257, the quill is more rigidly supported to increase the accuracy with which the spindle 26 may be operated in performing any desired machining operation.

To guide the spindle supporting head 257 for vertical movement, as shown in Fig. 10, there are provided toward the upper front edges of the column 256 a pair of vertically spaced forwardly projecting square guideways 264 and 265, having flat front guiding surfaces 266 and 267 lying in the same vertical plane and inner diametrically opposed guiding surfaces 268 and 269 respectively contiguous to the front surfaces and positioned at an angle of ninety degrees thereto. A pair of generally complementary square way surfaces 272 and 273 formed in spaced parallelism toward the opposite rearward edges of the spindle head 257 are disposed to be slidably received by the respective square way surfaces of the column, a tapered gib 274 being adjustably secured to the leftward way surface 272 of the head for maintaining the proper slidable engagement between the way surfaces of the head 257 and the complementary guiding surfaces of the column 256.

To retain the spindle head 257 in guiding relationship with the square way surfaces 264 and 265 of the column, a pair of vertical T-slots 275 and 276 formed toward the outer edges of the column 256 and extending inwardly from the front way surfaces 266 and 267 respectively, are adapted to be slidably engaged by a plurality of clamping T-bolts 278. Each one of the clamping T-bolts 278 extends forwardly through one of a plurality of spaced holes, respectively formed in a pair of laterally extending flanges 280 and 281 integrally formed with the spindle head 257 at the opposite rearward sides thereof, in manner to be threadedly engaged by a respective one of a plurality of clamping nuts 282. Thus, the clamping T-bolts 278 are retained in engagement with the column T-slots 275 and 276 regardless of the vertically adjusted position of the spindle head 257 along the upper front face of the column 256. By means of this arrangement, the spindle head 257 may be clamped to the column 256 by selectively actuating the clamping nuts 282 which are operative in conjunction with the respectively cooperating T-bolts 278 to effect an equalized clamping action and thus minimize deflection in manner that vertical feeding movement of the quill 27 may be accomplished along a line of travel that is exactly perpendicular to the top surface of the table 23 and parallel to the normal vertical path of travel of the spindle head 257.

To effect a selective vertical adjustment of the spindle head 257, as shown in Fig. 8, there is provided in the upper forward portion of the machine, a vertically disposed elevating screw 284 secured at its upper end to a forwardly extending cap 285 affixed to the top portion of the column 256 in manner that its forwardly projecting front portion will overlie the spindle head 257. The elevating screw 284 extends downwardly through a suitable opening provided in the top surface of the spindle head 257 in manner to engage with its lower threaded end a rotatable elevating screw nut 286 that is journalled to rotate in bearings 287 and 288 carried by a transverse horizontal web 289 integrally formed with the housing for the spindle head. At its lower end, the rotatable elevating screw nut 286 is provided with an integrally formed bevel gear 290 adapted to be engaged by a cooperating bevel gear 292 journalled for rotation about a horizontally disposed axis within the spindle head. The horizontally journalled bevel gear 292 is operatively connected to be actuated by a rotatable shaft (not shown) that terminates in a squared end 293, Fig. 7, disposed to project outwardly through the rightward wall of the head 257 for receiving a suitable actuating instrument (not shown). Thus, rotating the outer squared shaft end 293, Fig. 7, operates to actuate the bevel gear 292, Fig. 8, for rotating the elevating screw nut 286 which is adapted to cooperate with the vertically disposed fixed screw 284 for effecting a selective vertical adjustment of the spindle head 257.

It is to be particularly noted that, whenever the clamping nuts 282, Figs. 7 and 10, are in disengaged or unclamped position, the full weight of the spindle head 257 is suspended directly from the downwardly depending fixed elevating screw 284 which, in turn, is carried at its upper end by the forwardly extending column cap 285. Since the cooperating elevating screw nut 286 is journalled within the upper central portion of the head 257, therefore, the weight of the spindle head is so balanced as to minimize any possible deflection from a true vertical plane during vertical adjustment. This arrangement is particularly advantageous in facilitating the maintenance of the proper alignment of the spindle head 257 relative to its supporting column 256 in such manner that the tool spindle 26 may be operated with the extremely high degree of accuracy normally required in performing machining operations of the boring or thread cutting type.

As shown in Figs. 7 and 10, power for driving the tool spindle 26, as well as for effecting selective vertical feeding movement of the spindle carrying quill 27 is derived from the combined unitary power source and variable speed transmission mechanism 259 mounted within the rearward portion of the hollow base 255 of the machine and which comprises essentially a motor 295, an infinitely variable speed changing mechanism 296, and a fixed step range changing mechanism 297 operatively connected in series to provide an infinite selection of stepless output speeds. For convenience in effecting repairs, as well as for facilitating the initial assembly of the machine, the main drive mechanism 259, including the motor 295, the infinitely variable speed changer 296 and the fixed step range changer 297, is arranged to be removable from the base 255 as a single unitary structure.

To this end, as shown in Figs. 7 and 10, the unitary power source and transmission mechanism 259 is disposed to be supported by a movable carriage 299 that comprises essentially a vertical base plate 300 having secured to its upper and lower edges, respectively, a pair of horizontally disposed cylindrical guide bars 301 and 302 slidably mounted in spaced parallelism within the hollow base 255 of the machine for endwise movement. The upper guide bar 301 is slidably mounted within a bored hole formed in a vertical web 303 extending through the central portion of the base 255, and in a concentrically bored hole formed in a lug 304 extending inwardly from the rightward wall thereof. In a similar manner, the lower guide bar 302 is mounted for corresponding slidable movement within a bored hole formed in the vertical web 303 and a concentric hole formed in a lug 305 extending inwardly from the rightward wall of the base 255. In order that the entire support carriage 299 may be slidably moved to a position immediately to the rear of the column 256, there is provided an access door 306 hinged to the rearward column wall.

For convenience in disassembling the unitary main drive mechanism to effect adjustment or repair, the housing for the speed changer 296 is removably bolted to the inner side face of the carriage base plate 300, and the housing for the range change mechanism 297 is in turn bolted to a side face of the speed changer housing 296. Likewise, the motor 295 is removably bolted to a base plate 307 that is pivotally secured at its rightward end to the vertical support plate 300 of the carriage 299. To effect the required pivotal adjustment of the motor 295, an adjusting screw (not shown) threadedly carried toward the leftward edge of the motor base plate 307 in well known manner is disposed to engage with its lower end the upper surface of the housing for the speed changer 296. Thus, while the motor 295, the infinitely variable speed changer 296, and the fixed step range changer 297 in themselves constitute separate independent units, they are secured together and arranged to operatively cooperate in such manner as to constitute a single unitary mechanism arranged to be conveniently removable from the machine in its entirety.

Although a unit type of construction has been utilized in some prior types of machine tools, it has been the usual practice to so arrange the units that a certain amount of preliminary disassembly work was required before a particular one of the units could be removed from the machine in order to effect replacement or repair. In some instances, because of certain inherent structural limitations in the construction of the constituent units, as well as the machine itself, it has been impracticable to reassemble into the machine a new unit in its entirety to replace a unit that has been removed for adjustment or repair. In some prior types of machine tools, therefore, considerable additional time has been required to restore a machine to productive operation since it was necessary to completely repair the damaged unit before it could be reassembled into its operative position.

This difficulty has been obviated in the instant invention, as shown in Figs. 7 and 11, by constructing and mounting the main driving mechanism 259 which includes the major driving units of the machine in such a manner that it can be removed from the column as a single unitary structure with a minimum of difficulty. In the event of an accident, the separate units including the motor 295, the variable speed changer 296, and the fixed step range changer 297 may be quickly inspected to localize any difficulty that might have arisen. Likewise, if the damage is extensive, one or another of the units may be replaced in their entirety in order to expedite the speed with which the machine can be restored to productive operation. This arrangement is particularly advantageous in machine tools that are utilized in installations where a continued high level of productivity must be maintained.

From the main driving mechanism 259 contained within the hollow base 255, as shown in Figs. 7, 8 and 11, power is transmitted to rotate a vertically extensible main driving shaft 315 that extends upwardly through the hollow central portion of the column 256. The extensible main driving shaft 315 comprises a lower shaft 316 that is operatively connected to be directly driven by the fixed step range changer 297, and, that is provided with an internally splined upper end 317 disposed to have slidable engagement with an externally splined end 318 of an upper shaft 319 journalled to rotate in a pair of vertically spaced brackets 322 and 323 that are secured to the rearward wall 324 of the spindle head 257 in manner to project inwardly into the upper portion of the hollow column 256. A pulley 325 secured to the upper driving shaft 319 is operatively interconnected by means of an endless bolt 326 to drive a pulley 327 integrally formed with a flywheel 328 and secured to the upper end of the hollow spindle driving shaft 37 journalled at its upper end in the head 257 and at its lower end in the bearing 41 slidably carried for telescoping vertical movement within the vertically adjustable quill 27. The upper hollow spindle driving shaft 37 has slidable splined engagement with the telescoping splined shaft 36 which, in turn, is directly connected to drive the tool spindle 26. To impart a positive drive to the spindle 26, each one of the pulleys 325 and 327 is provided with a plurality of peripherally spaced cogs 330 that are disposed to be engaged by complementary cogs 331 formed on the inner surface of the interconnecting driving belt 326 which is of the timing or positive drive type. Although, normally, the spindle 26 is positively driven during a cutting operation, the driving belt 326 is disposed to provide sufficient resiliency to minimize vibration, as well as to provide some measure of protection to the unitary main driving mechanism 259 in the event of an accident involving a complete, even though monetary, cessation of spindle rotation. For facilitating the removal and replacement of a driving belt, the pulleys 325 and 327 are each provided with removable upper flanges 332 and 333 that are secured to their respective pulley hubs by means of cap screws.

Since the supporting brackets 322 and 323 are secured to the rearward wall 324 of the spindle head 257, the upper vertical driving shaft 319 rotatably carried by the brackets will be elevated or lowered in telescoping relationship with the lower driving shaft 316 in accordance with the vertical adjustment of the spindle head 257 along the front face of the column 256. The upper front face of the column 256 is provided with a vertically elongated opening 335 arranged to permit a corresponding vertical movement of the various interconnecting members including the driving belt 326 extending rearwardly from the spindle head 257 into the hollow upper portion of the column 256. The opening 335 is so located in the upper front face of the column 256 as to be fully covered by the spindle head 257 regardless of its vertically adjusted position therealong. A vertically upstanding cover cap 336 secured to the upper rearward portion of the head 257 is arranged to enclose the uppermost portion of the elongated opening 335 in the front face of the column 256 whenever the head is moved to its lowermost position.

In order to drive the tool spindle 26 at a selected rate of speed, the infinitely variable speed changer 296 and the fixed step range changer 297, Figs. 7 and 11, operatively interposed in the spindle driving train between the motor 295 and the vertically extensible main driving shaft 315, are arranged to provide an infinite selection of speeds without discontinuity or overlapping therebetween. The infinitely variable speed changing transmission mechanism 296 may be of any well known type adapted to be selectively adjustable for transmitting power throughout an infinite selection of stepless speeds within its overall range of driving ratios, and in manner to bridge the gaps in speed ratio between the fixed steps of the range changing mechanism 297.

Figure 12:
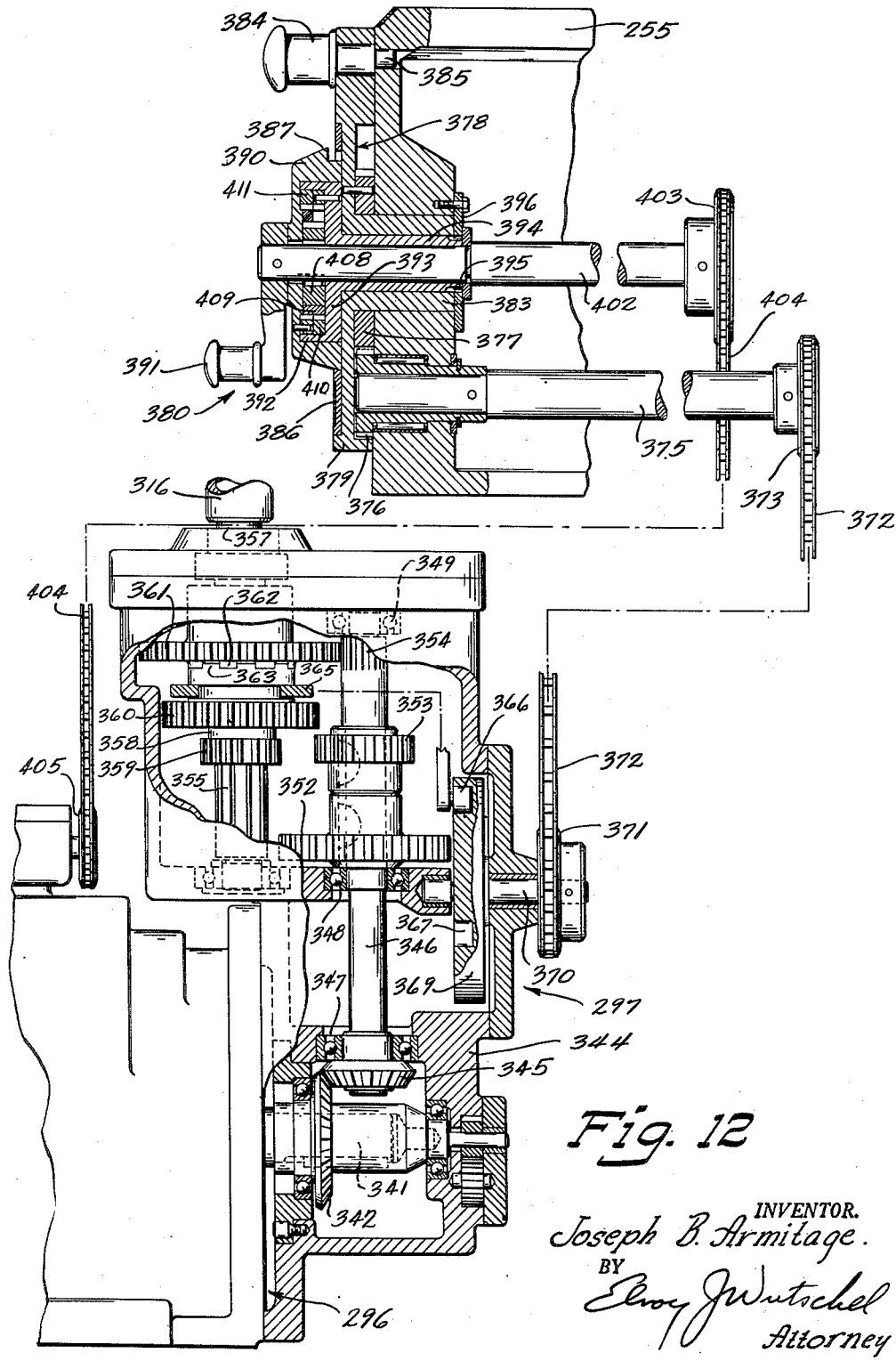
Fig. 12 is an enlarged schematic view of a modified form of infinitely variable speed changing transmission mechanism together with the speed indicating and controlling apparatus therefor.

From the motor 295, as shown in Figs. 7 and 11, power is transmitted through a belt 338, forming a resilient drive and being operatively connected to rotate a pulley 339 secured to an input driving shaft 340 of the infinitely variable speed changing transmission mechanism 296. From the infinitely variable speed changer 296, as shown in Fig. 12, power is transmitted through a horizontally journalled output shaft 341 extending outwardly therefrom to engage a bevel gear 342 rotatably journalled in the lower portion of a housing 344 disposed to enclose the fixed step range changing transmission mechanism 297. The bevel gear 342 is disposed to meshingly engage a complementary bevel gear 345 secured to the lower end of a vertical primary shaft 346 journalled within the housing 344 in bearings 347, 348 and 349. The primary shaft 346 has affixed to it within the housing 344, three spur gears 352, 353 and 354 of different diameters for driving a parallel secondary shaft 355 journalled in the housing 344 at one of three selected speed ratios.

As shown in Figs. 7 and 12, the vertically journalled secondary shaft 355 projects upwardly from the housing and carries on its exposed upper end 357 the lower driving shaft 316 of the vertically extensible main driving shaft 315. Within the housing, the secondary shaft 355 is splined to slidably engage a shiftable gear couplet 358, comprising two spur gears 359 and 360, that are complementary to and adapted to mesh selectively with the gears 352 and 353 respectively carried by the primary shaft 346 to effect either of two driving ratios. A third spur gear 361 is rotatably journalled on the upper portion of the secondary shaft 355 in manner to be in constant meshing engagement with the third gear 354 carried by the primary driving shaft 346. The gear couplet 358 is provided on its upper hub with clutch teeth 363 disposed to engage complementary clutch teeth 362 formed on the hub of the gear 361 to effect a selective driving connection between the primary shaft 346 and the secondary shaft 355 for effecting the third driving ratio whenever the gears 359 and 360 are disengaged from their respectively cooperating driving gears. In order to selectively interrupt the transmission of power from the primary shaft 346 to the secondary shaft 355, the gear couplet 358 may be slidably shifted to a neutral position on the shaft 355 that is intermediate the driving gears 352 and 353 in manner that the clutch teeth 363, the gear 360 and the gear 359 of the shiftable couplet are in disengaged position relative to their complementary driving members.

For positioning the gears 359 and 360, as well as the clutch teeth 363, to select the desired fixed step speed ratio, the couplet 358 is provided with an annular groove disposed to be engaged by a shifting yoke 365 carried for slidable movement by a vertically disposed shifting rod (not shown) mounted in the housing 344. The shifting yoke 365 is operatively connected in well known manner to be actuated by a cam follower 366 which engages a cam track 367 formed on the inner face of a rotatably mounted shifting control cam plate 369. The cam plate 369 is secured to the inner end of a stub shaft 370, journalled in a side wall of the housing 344, and is rotatable therewith to effect a controlled vertical movement of the shifting yoke 365 to, in turn, shift the couplet 358 into position for obtaining the desired driving ratio between the primary shaft 346 and the secondary shaft 355.

To effect selective rotational movement of the cam plate 369, the stub shaft 370 has secured to its opposite outer end a sprocket wheel 371 which is driven by a chain 372 interconnected with another sprocket wheel 373 secured to the rearward end of a horizontally disposed control shaft 375 journalled to rotate within the bed 255, as shown in Figs. 7 and 12. The horizontally journalled control shaft 375 extends forwardly through the hollow bed 255 toward the front of the machine and has secured to its extreme forward end, as shown in Fig. 12, a spur gear 376 that has meshing engagement with a driving gear 377 pinned to the inner face 378 of a rotatable speed indicating dial 379 constituting one element of a speed indicating and control mechanism 380 at the front of the machine. The speed change dial 379 is provided with an integrally formed inwardly extending flanged hub 383 that is journalled to rotate in a horizontally bored hole formed in the front vertical wall of the bed 255. A range change crank handle 384 secured to the indicating dial 379 is provided with a resiliently biased latching plunger 385, which, when withdrawn from a cooperating latching opening in the front face of the bed 255, permits the crank 384 and the dial 379 to be turned to a new position in which another latching opening is engaged by the plunger 385. This results in turning the horizontal adjusting shaft 375 to rotate the cam plate 369 for effecting vertical movement of the shifting fork 365 to selectively shift the gear couplet 358 and thereby effect a different driving connection between the primary driving shaft 346 and the secondary shaft 355.

Three latching openings are provided in spaced relationship in the front wall of the bed 255, as shown in Fig. 11, in manner to cooperate with the resiliently biased latching plunger 385 for positioning the indicating dial 379 in the three positions corresponding with the respective three stepped speed ratio positions of the shiftable gear couplet 358. A fourth latching opening is disposed to cooperate with the latching plunger 385 of the dial 379 in such manner that the gear couplet 358 is positioned in an intermediate neutral position in which the spur gears 359 and 360, as well as the clutch teeth 363, are out of mesh with their respective driving members.

The range indicating dial 379 carries speed indicia 386 divided into three segments corresponding respectively with the speed ranges provided by the three gear ratios of the fixed step range changing mechanism 297. For indicating the rotational speed of the spindle 26, the speed indicia 386 on the indicating dial 379 are disposed to be read against a cooperating pointer 387 carried by a concentrically rotatable speed indicating dial 390 that is operatively connected to be moved through an arc of approximately 120° (degrees) in accordance with the adjusted position of the infinitely variable speed adjusting mechanism 296, Fig. 7. A rotatable speed changing crank 391 operatively connected to adjust the infinitely variable speed changing transmission mechanism 296 is connected through reduction gearing to effect movement of the pointer 387 secured to the speed change dial 390 through an arc of approximately 120° (degrees) that is proportioned to cover the full range of adjustment of the infinitely variable speed adjusting mechanism. Thus, the pointer 387, having a restricted range of movement, is disposed to cooperate with one or another of the three segments into which the indicia 386 carried by the cooperatively movable dial 379 is divided depending on the rotatably adjusted position of the dial. By means of this arrangement, the pointer 387 carried by the speed change dial and the indicia 386 carried by the speed indicating dial cooperate to provide a visual indication of a continuous sequence of infinitely adjusted spindle speeds, in accordance with the respectively adjusted positions of the infinitely variable speed changing mechanism 296 and the fixed step range changing mechanism 297.

As shown in Fig. 12, the speed change indicating dial 390 is provided on its rearward face with an enlarged bore and is disposed to be rotatably carried by a flanged peripheral rim 392 integrally formed with a stationary cylindrical support member 393. The enlarged flanged portion of the support member 393 is retained in a non-rotating position immediately in front of the range change dial 379 by means of a rearwardly extending hollow cylindrical hub 394 integrally formed therewith and that is provided at its extreme inner end with serrations 395 disposed to be engaged by complementary serrations formed on a clamping plate 396 secured to the inner wall of the bed 255. The stationary support member 393 is provided with a horizontal bore extending through its rearwardly extending cylindrical hub 394 in manner to rotatably support the forward end of a horizontal control shaft 402 for the speed changing mechanism 296 and that is disposed in parallelism with the adjusting shaft 375 for the range changing mechanism 297. The speed adjusting shaft 402 has pinned to its extreme forward end, immediately in front of the concentrically rotatable speed change dial 390, the speed changing crank 391. The speed adjusting control shaft 342 extends rearwardly through suitable bearings carried by the bed 255, and has secured to its extreme rearward end a sprocket wheel 403. From the sprocket wheel 403, rotative movement is transmitted by a chain 404 operatively connected to effect selective rotation of a cooperating sprocket wheel 405 journalled toward the top central portion of the housing for the speed changer 296 and that is operatively connected to effect selective adjustment of the infinitely variable speed changing mechanism. Thus rotating the speed changing crank 396 at the front of the bed 255 operates to rotate the horizontally journalled adjusting shaft 402 for directly adjusting the infinitely variable speed changing transmission mechanism 296.

To effect an incremental movement of the pointer 387 secured to the speed change dial 390 throughout the arc of approximately 120° (degrees) constituting its full range of adjustment, the dial 390 is connected by means of epicyclic reduction gearing to be actuated by the speed changing crank 391. To this end, a circular plate 408 is eccentrically keyed to the forward end of the speed adjusting shaft 402 within a circular recess formed in the front face of the stationary flanged support member 393 in manner to be eccentrically rotated about the axis of the shaft by rotational adjusting movement of the speed changing crank 391. The circuuar plate 408 is disposed to rotate within an enlarged bore of a spur pinion 409 disposed to have rolling engagement with internal gear teeth respectively formed on the inner periphery of a pair of contiguously and parallelly disposed ring gears 410 and 411 that are disposed to cooperate therewith in manner to constitute a planet differential. To effect a rotational and rolling advancement of the spur gear 409 as the eccentrically positioned circular plate 408 is caused to rotate, the inner ring gear 410 is pinned to the front face of the stationary flanged support member 393 in manner to be retained therewith in non-rotating position. The outer internal ring gear 411 is pinned to the rearward face of the hollow speed change indicating dial 390 which is journalled to rotate about the outer periphery of the flanged support member 393. For effecting a controlled incremental rotational movement of the dial 390, the internal ring gear 411 pinned thereto is provided with two less gear teeth than are provided in the stationary internal ring gear 410 immovably secured to the stationary support member 393. As the speed changing crank 301 is moved to rotate the adjusting shaft 402, therefore, the resulting rolling rotational engagement of the spur pinion 409 with the stationary internal ring gear 410 is operative to effect a slight rotational advancement of the contiguously and movably disposed internal ring gear 411. Continued rotational movement of the crank 391 results in a corresponding movement of the speed change dial 390 and the pointer 387 secured thereto through an arc of approximately 120° (degrees) across the face of the concentrically and independently rotatable speed indicating dial 379 in manner to cooperate with one or another of the three segments of speed indicia provided thereon. By means of this arrangement, the indicating dial 379 and the speed change dial 390 are disposed to be moved by the adjusting control cranks 384 and 391 respectively associated therewith in manner to cooperate for providing a visual indication of the rotational speed of the spindle 26 in accordance with the respectively adjusted positions of the fixed step range changing transmission mechanism 297 and infinitely variable speed changing transmission mechanism 296.

In order to provide for either manual or power operable vertical adjustment of the spindle carrying quill 27 within its independently vertically adjustable supporting head 257, as shown in Fig. 8, there is provided a selectively operable elevating mechanism 413 that is generally similar to the elevating mechanism hereinbefore described for effecting selective vertical adjustment of the quill 27 within the non-movable supporting head shown in Fig. 4. The elevating mechanism 413 for effecting adjustment of the quill 27, as shown in the modified form of the machine in Fig. 8, is contained within the spindle head 257 for vertical movement therewith and is operatively connected to be selectively actuated at a feed or a rapid traverse rate either by the vertically extensible main driving shaft 315 or by a separate rapid traverse motor 414 mounted within an inwardly extending circular recess 415 formed in the rearward wall of the column 256.

As shown in Fig. 8, the elevating mechanism 413 for moving the quill 27 includes the elevating screw 121 journalled to rotate in the head 257 in parallelism with the quill 27 and in manner to threadedly engage with its upper end an elevating screw nut 416 suspended in gimbals by the quill cap 123 which, in turn, is secured to the upper end of the quill 27 as hereinbefore described. Thus, rotational movement of the screw 121 will operate in conjunction with the cooperating non-rotatable nut 416 to effect selective vertical movement of the quill 27 and the spool spindle 26 journalled therein. The elevating screw nut 416 is carried by the quill cap 123 for a slight lateral movement as well as for a pivotal movement in mutually transverse planes in manner to engage the elevating screw 121, which is journalled only toward its lower end in the head 257, without any binding or cramping action. As shown in Figs. 8 and 9, universal pivotal movement of the nut 416 is achieved by forming the nut with two diametrically opposed lateral extensions journalled to rotate about a substantially horizontal axis in a carrier 417. The carrier 417 in turn is rotatably supported for pivotal movement about a transverse horizontal axis by a pair of concentric pins 418 and 419 carried by a pair of stationary lateral arms 421 and 422 spaced in parallelism and secured to the quill cap 123.

A principal advantage afforded by supporting the elevating screw nut 416 in gimbals is the convenience and accuracy with which the elevating screw 121 may be fitted to threadedly engage the nut 416 in the initial assembly of the machine, the gimbals providing a means for automatically aligning the nut 416 with the cooperating screw 121. In a machine of the jig boring type, it is especially necessary that the nut 416 be engaged by the screw 121 without any binding or cramping action in its movement therealong that might cause a lateral deflection of the upper end of the quill 27 with a resultant deflection of the spindle 26. Regardless of how accurately the quill 27 may be fitted for vertical sliding movement within the bored hole formed in the head 257, the slightest lateral pressure against the upper end of the quill 27 might cause a corresponding deflection of the spindle 26 and thereby greatly increase the possibility of inaccuracy as a cutter, for example the cutter 261, carried by the tool spindle 26 is fed downwardly in performing a boring operation. It will be apparent that the possibility of producing lateral pressure against the quill 27 will be magnified in the event the elevating screw nut is rigidly carried by the quill cap 123. This difficulty, however, is completely obviated in the modified form of elevating screw nut 416 and gimbaled mounting arrangement therefore shown in Fig. 8 which provides a means for automatically aligning the nut 416 with the screw 121, and still permits the nut and screw to cooperate in such a manner as to exert a precise control of the linear advancement of the spindle supporting quill 27. The gimbaled or double trunnion mounting arrangement, there shown, is not only arranged to provide pivotal movement of the nut 416 in mutually transverse planes, but is likewise disposed to permit a slight lateral sliding movement of the nut 416 within its carrier 417 along one axis of rotation, as well as a slight lateral sliding movement of the carrier 417 along the other transverse axis of rotation between the supporting arms 421 and 422.

For effecting selective power operable directional movement of the quill 27 within its supporting head 257, as shown in Fig. 8, one or another of the oppositely rotatable reversing bevel gears 124 and 125 journalled toward the lower end of the elevating screw 121 in manner to meshingly engage the horizontally journalled driving bevel gear 126, is disposed to be selectively coupled to the screw by means of the shiftable clutch collar 128 that is slidably splined thereon intermediately of the reversing bevel gears.

Shiftable movement of the clutch collar 128 into operative clutching engagement with one or the other of the bevel gears 124 or 125, or to a neutral position therebetween, as shown in Fig. 8, is effected by operating a pivotal feed lever 136 mounted on the right side of the head 256, Fig. 7. For effecting movement of the quill 27 at a fast or rapid traverse rate, the feed lever 136 carries at its outer enlarged end a push button 425 which operates mechanical linkage extending through the lever to close a switch (not shown) that is electrically connected in well known manner to effect selective energization of the independently operable rapid traverse motor 414 mounted in the column 255.

For transmitting power from the rapid traverse motor 414 to drive the bevel gear reversing mechanism in the vertically adjustable head 257, an inwardly extending output shaft 426 of the rapid traverse motor is connected by means of a universal joint 427 to drive a splined shaft 428 that is slidably engaged by a complementary internally splined sleeve 429 which, in turn, is connected by means of a second universal joint 430 to drive a stub shaft 432 horizontally journalled in a bracket 433 extending forwardly from the rearward wall of the head 257. The externally splined shaft 428, together with its cooperating internally splined sleeve 429, form an extensible connection between the universal joints 426 and 430 respectively, for transmitting power from the rapid traverse motor 414 to drive the horizontal stub shaft 432 irrespective of the vertically adjusted position of the head 257. The stub shaft 432 has secured to its inner end a pinion 434 that meshingly engages the spur gear 144 connected to the stub shaft 127 by means of the safety clutch 145 for rotating the driving bevel gear 126 in manner to drive the oppositely rotatable reversing bevel gears 124 and 125 at rapid traverse rate. With the feed lever 136 at the right side of the head 256 positioned to effect selective engagement of the clutch collar 128 with one or another of the bevel gears 124 and 125, therefore, power is transmitted from the separate rapid traverse motor 414 in the column to rotate the elevating feed screw 121 whenever the switch button 425 carried by the lever 136 is depressed.

Power for effecting movement of the quill 27 at a selected feed rate, as shown in Figs. 7 and 8, is derived from the main drive motor 295 in the bed 255 and which is operatively connected through the infinitely variable speed changing mechanism 296 and the fixed step range changing mechanism 297 to drive the vertically extensible main driving shaft 315. The upper portion 319 of the telescoping main drive shaft 315, as shown in Figs. 8 and 11, is provided with a worm gear 435 that has meshing engagement with a worm wheel 436 keyed to a horizontal drive shaft 437 journalled to rotate in bearings 439 and 440 carried by the bracket 322 secured to the rearward wall of the head 257. The drive shaft 437 has keyed to its opposite forward end a driving pinion 441 that is disposed to engage the input gear 154 of the feed rate selecting gear changing mechanism 151 which is mounted in the vertically movable head 257 and operates through an overrunning clutch (not shown) to drive the gear 153 which, in turn, meshes with the gear 144 on the stub shaft 127 connected to drive the reversing mechanism. The overrunning clutch is operative to transmit power for driving the gear 153 at a selected feed driving speed whenever the independently operable rapid traverse motor 414 is deenergized. If the rapid traverse drive motor 414 is energized to drive the gear 144 at rapid traverse rate, however, the overrunning clutch will operate in well known manner to permit the driving gear 153 to overrun the inner feed driving member of the clutch, thus effecting an automatic disengagement of the feed rate changing transmission mechanism 151.

Adjustment of the rate changing transmission mechanism 151 for driving the quill 27 at a selected feeding rate is effected in well known manner by operation of the rate changing and indicating mechanism 161 mounted on the right side of the head 257, as shown in Fig. 7. Since the rate changer 151 is driven by the vertically telescoping main driving shaft 315, Fig. 8, which also drives the spindle 26 at a selected speed rate, the rate of feeding movement of the quill 27 effected by the rate changer 151 is directly proportional to the speed of rotation of the spindle.

Manual adjustment of the quill 27 may be effected by actuating a hand wheel 165 rotatably mounted on the right side of the spindle head 257, as shown in Fig. 7. The hand wheel 165 is operatively connected to selectively actuate a bevel gear 168, Fig. 8, keyed to the lower end of the elevating feed screw 121.

To facilitate vertical adjustment of the quill 27, its weight is counterbalanced by means of the counterweight 131 that is suspended within the column by the chain 132 which operates over the idler sprockets 133 and 134 journalled in the upper part of the head 257, and is connected to the quill cap 123 in manner to exert force upwardly to counterbalance the weight of the quill 27 and spindle 26. As will be readily apparent, the counterweight will be operative to counterbalance the weight of the quill 27 regardless of the vertically adjusted position of the spindle head 257 along the column 256.

Figure 14:
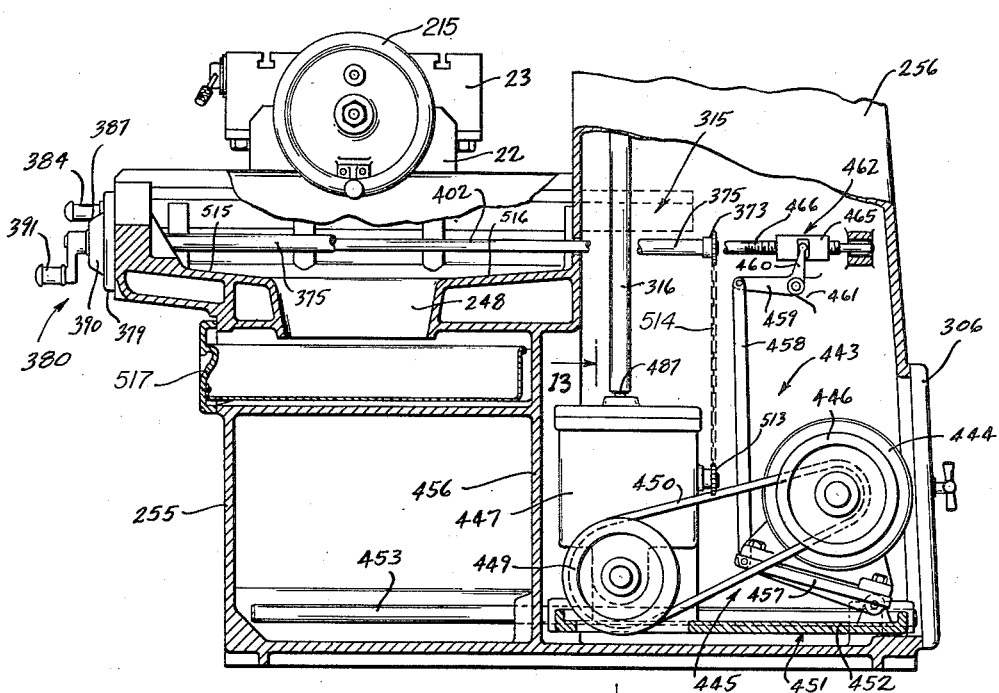
Fig. 14 is a view in vertical section through the base of a modified form of the precision boring machine and showing a further modified form of combined unitary power source and variable speed transmission mechanism.

In a further modified form of the invention, as shown in Fig. 14, there is provided a modified form of a combined unitary power source and infinitely adjustable variable speed mechanism 443 removably mounted within the rearward portion of the hollow base 255 of the machine and operatively connected to drive the vertically telescoping main driving shaft 315 for transmitting power to rotate the tool spindle 26 and effect selective vertical feeding movement of the quill 27. As shown in Fig. 14, the combined power source and variable speed mechanism 443 comprises a pivotally supported motor 444, an infinitely variable speed changing mechanism 445 including an adjustable pitch pulley 446 driven by the motor and a fixed step range changing mechanism 447 provided with a rotatably journalled input pulley 449 that is operatively connected to be driven through an interconnecting driving belt 450. For convenience in effecting adjustment or repair, the main drive mechanism 443, including the motor 444, the infinitely variable speed changer 445, and the fixed step range changer 447, is arranged to be removable from the base 255 in its entirety as a single unitary structure.

Figure 13:
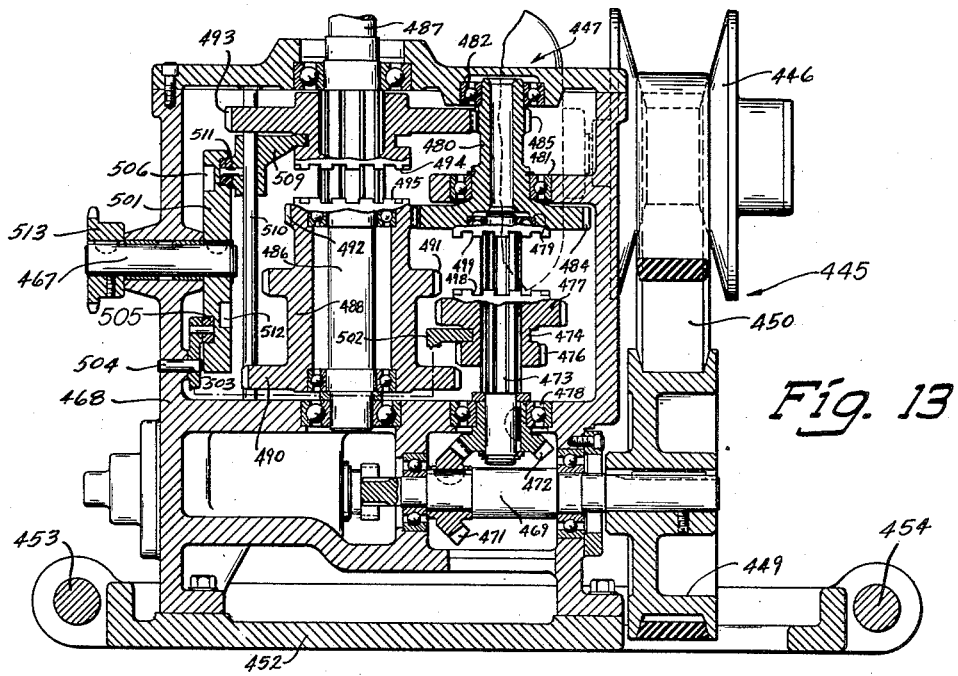
Fig. 13 is a view in vertical section through a modified form of range changing transmission mechanism, taken along the line 13—13 in Fig. 14.

To this end, as shown in Figs. 13 and 14, the unitary power source and variable speed transmission mechanism 443 is disposed to be supported by a movable carriage 451 that comprises a horizontal support member or base plate 452, having secured to its opposite edges a pair of horizontally disposed cylindrical guide bars 453 and 454 slidably mounted in spaced parallelism within the hollow base 255 of the machine for endwise movement. The guide bars 453 and 454 are respectively mounted within a pair of horizontally spaced bored holes formed in a vertical web 456 in the base 255 and a pair of concentrically aligned bored holes formed in a pair of lugs (not shown) respectively secured to opposite inner side walls of the base 255. By opening the access door 306 hinged to the rearward wall of the column 256, therefore, the carriage 451 may be moved rearwardly to afford convenient access to any of the units comprising the unitary driving mechanism 443.

For convenience in disassembling the main drive mechanism 443, the fixed step range change mechanism 447 is removably bolted to the horizontal support member 452 of the movable carriage 451. The motor 444 is bolted to a base plate 457 which, in turn, is pivotally carried by the support member 452 for selective pivotal adjustment. To retain the motor 444 in any predetermined position of pivotal adjustment, there is provided a selectively operable linkage arrangement including a movable connecting bar 458 that is pivotally secured at its lower end to the motor base plate 457 and that has its opposite upper end pivotally secured to one arm 459 of a pivotal bell crank 460. The bell crank 460 is pivotally mounted on a lug 461 carried by an inner wall of the column 256 and is disposed to engage with its opposite arm a vertical slot 462 formed in a travelling nut 465 that threadedly engages a cylindrical threaded extension 466 secured to the rearward end of the range change control shaft 402 horizontally journalled within the hollow base 255.

Selective adjustment of the infinitely adjustable speed changing mechanism 445 is effected by pivotally moving the motor base plate 457 to vary the pitch diameter of the adjustable pitch pulley 446 by action of the cooperating driving belt 450 about the non-adjustable input pulley 449 for the range changer 447. The speed changing mechanism 445 is infinitely adjustable throughout an overall range of driving ratios adapted to bridge the successive steps of the fixed step range changing mechanism 447 without discontinuity or overlapping therebetween and in manner to cooperate therewith for driving the tool spindle 26 throughout an infinite selection of speeds covering a wide operating range. Since the variable speed belt changing transmission mechanism 445 has a necessarily limited range of driving ratios, the range change mechanism 447 is disposed to provide a relatively large number of different fixed step driving ratios in order that the tool spindle 26 may be driven at any selected speed in an extremely wide range of infinite speeds. To this end, as shown in Fig. 13, the range changing mechanism is of the shiftable gear type, adapted to provide a total of six different speed ratio range changes by selective rotational movement of a single controlling stub shaft 467 journalled in the leftward wall of a housing 468 disposed to completely enclose the range changing mechanism 447.

From the speed changing mechanism 445, as shown in Fig. 13, power is transmitted to drive the input pulley 449 which is keyed to an outwardly extending end of a horizontal input shaft 469 journalled to rotate in the lower portion of the housing 468. From the input shaft 469, power is transmitted through a bevel gear 471 keyed thereto within the housing, and that is disposed to have meshing engagement with a complementary bevel gear 472 secured to the lower end of a vertically journalled primary shaft 473 that is splined to carry a shiftable speed selecting gear couplet 474 comprising two spur gears 476 and 477 of different diameters. The primary shaft 473 is journalled at its lower end to rotate in a bearing 478 carried by the housing 468, and, at its upper end, in a bearing 479 carried by a concentrically rotatable gear couplet 480 journalled in bearings 481 and 482 carried by the housing 468 and that is provided with a pair of spur gears 484 and 485 of different diameters. From the primary shaft 473, power is transmitted at one of six different speed ratios to drive a parallel secondary shaft 486 journalled in the housing 468, and extending upwardly therefrom to carry on its exposed upper end 487 the lower portion 316 of the vertically extensible main driving shaft 315.

Within the housing 468, there is provided a gear cluster 488 journalled on the lower end of the secondary shaft 486 and being provided with three spur gears 490, 491 and 492 of different diameters. The lower two spur gears 490 and 491 of the gear cluster 488 are disposed to be complementary with and have selective meshing engagement with the spur gears 476 and 477, respectively, of the shiftable couplet 474 carried by the primary shaft 473. The upper spur gear 492 of the gear cluster 488 is disposed to be in constant meshing engagement with the spur gear 484 of the couplet 480 which is disposed to form, in effect, a back gear arrangement for transmitting power from the upper spur gear 485 formed therewith to drive a complementary range change spur gear 493, slidably splined on the upper end of the secondary shaft 486 for selective shiftable movement, at a low range and for driving the secondary shaft at the three lowest output speeds. The range change gear 493 slidably splined on the secondary shaft 486 may be shifted downwardly in manner that clutch teeth 494 formed on the hub thereof are moved into clutching engagement with complementary clutch teeth 495 formed on the upper end of the rotatably journalled gear cluster 488 for driving the secondary shaft at the three highest output speeds.

With the upper range change gear 493 shifted into engagement with its complementary driving gear 485 of the gear cluster 480, as shown in Fig. 13, power may be transmitted from the primary shaft 473 to drive the secondary shaft 486 at the three lowest stepped speeds by shiftably moving the speed selecting gear couplet 474 along the splined primary shaft to one or another of three different driving positions. To obtain the lowest speed driving ratio, the couplet 474 is shifted downwardly in manner that the spur gear 476 thereon is moved into engagement with the complementary spur gear 490 of the gear cluster 480, from which power is transmitted through the constantly meshing spur gear 492 to drive the gear couplet 480, thence, from the upper spur gear 485 formed thereon to drive the shiftable range change gear 493 splined on the upper portion of the secondary shaft 486. For transmitting power from the primary shaft 473 at the second speed ratio, the spur gear 477 of the couplet 474 is shifted into meshing engagement with the spur gear 491 of the gear cluster 488. To obtain the third driving ratio, the gear couplet 474 is shifted upwardly along the primary shaft 473 in manner that clutch teeth 498 integrally formed on the upper hub of the couplet are moved into meshing engagement with complementary clutch teeth 499 formed on the lower end of the concentrically rotatable cluster gear 480.

In like manner, with the clutch teeth 494 on the lower hub of the range change gear 493 shifted into engagement with the complementary clutch teeth 495 of the gear cluster 488, the speed selecting gear couplet 474 may be sequentially shifted along the primary shaft 473 in manner to transmit driving power through the spur gear 476, the gear 477, or the clutch teeth 498 to drive the secondary shaft 486 at one or another of the three highest speed ratios.

To effect selective adjustment of the fixed step range change mechanism 447 for driving the secondary shaft 486 at one or another of the six available range change driving ratios, a cam plate 501 secured to the inner end of the rotatable adjusting shaft 467 is operatively connected to effect coordinated shiftable movement of the range change gear 493 and the speed selecting gear couplet 474. The couplet 474 is provided with an annular groove disposed to be engaged by a shifting fork 502 slidably mounted on a vertical rod (not shown) carried by the housing 468. The shifting fork 502 is operatively connected to be actuated by the lower end of a shifting lever 503 journalled for pivotal movement on a pin 504 carried by the leftward inner wall of the housing 468. At its upper end, the shifting lever 503 is provided with a cam follower 505 disposed to engage a cam track 506 formed in the rearward face of the cam plate 501 in manner that approximately the first one-half revolution of the cam plate will operate to effect sequential shiftable movement of the speed selecting gear couplet 474 through its three distinct positions of adjustment for transmitting power from the primary shaft 473 to drive the secondary shaft 486 at a selected one or another of three different speed driving ratios. One complete revolution of the cam plate 501, is operative to effect repetitive movement of the speed selecting gear couplet 474 through two complete cycles of shiftable adjustment.

In a similar manner, the range change gear 493 is provided with an annular groove disposed to be engaged by a shifting fork 509 slidably carried for vertical movement on a vertical rod 510 mounted within the housing 468. A cam follower 511 affixed to the shifting fork 509 is arranged to engage a cam track 512 formed on the front face of the cam plate 501 for effecting shiftable movement of the range change gear 493 into driving engagement with either the spur gear 485 of the couplet 480 or the clutch teeth 495 of the gear cluster 488, as well as into a neutral position midway therebetween. The cam track 512 is so disposed that during approximately the first one-half revolution of the cam plate 501, the range change gear 493 will be retained in driving engagement with the spur gear 485 of the gear couplet 480, coinciding with the first series of three shiftably adjusted positions of the speed selecting gear couplet 474 along the primary shaft 473. Likewise, during approximately the second one-half revolution of the cam plate 501, the clutch teeth 494 on the lower hub of the change gear 493 will be retained in driving engagement with the clutch teeth 495 of the gear cluster 488, coinciding with the second series of three sequentially adjusted positions of the speed selecting gear couplet 474. To interrupt the transmission of power from the primary shaft 473 to the secondary shaft 486, the cam plate 501 may be so positioned that the range change gear 493 is retained in a neutral position midway along the splined upper portion of the secondary shaft 486.

To effect rotatable movement of the cam plate 501 for obtaining a selectively coordinated shiftable movement of the shiftable gearing in range change mechanism, as shown in Figs. 13 and 14, a sprocket wheel 513 secured to the outer end of the stub shaft 467 is operatively connected by a chain 514 to be driven by the sprocket wheel 373 secured to the inner end of the horizontally journalled range change control shaft 375. As hereinbefore described, the control shaft 375 is operatively connected at its forward end to be actuated by the crank 384 carried by the speed change indicating dial 379 rotatably mounted on the front face of the bed 255. The range change crank 384 is provided with a latching plunger (not shown) that is disposed to engage one or another of six latching openings provided in the front face of the bed 255 for rotatably moving one or another of six segments of speed indicia carried by the speed change dial 379 into a position corresponding with the respective six speed ratio positions of the coordinately shiftable range change gear 493 and the speed selecting couplet 474.

The speed changing crank 391 at the front of the bed is operatively connected to effect pivotal movement of the concentrically journalled speed indicating dial 390 in manner that the pointer 387 carried thereby is moved through an arc of approximately 60° (degrees) across the face of the speed change dial 379. The pointer 387 is disposed to cooperate with one or another of the six segments of speed indicia carried by the speed change dial to indicate the rotational speed of the tool spindle 26 according to the selectively adjusted positions of the infinitely variable speed changing transmission mechanism 445 and the fixed step range changing transmission mechanism 447, respectively. Adjusting movement of the speed changing crank 391 is operable to rotate the horizontally journalled speed control shaft 402 extending rearwardly through the hollow bed 255 for directly effecting a selective adjustment of the infinitely variable speed belt changing mechanism 445. As the crank 391 is turned to rotate the shaft 402, the threaded extension 466 secured thereto is likewise rotated to effect longitudinal movement of the traveling nut 465. Movement of the nut 465, in turn, operates to effect pivotal movement of the bell crank 460 connected through the movable bar 458 to selectively vary the pivotal adjustment of the motor base plate 457. Pivotal movement of the motor base plate 457 operates to effect an adjustment in the pitch diameter of the adjustable pulley 446 by action of the cooperating belt 450 about the input pulley 449 connected to drive the fixed step range changing transmission mechanism 447.

Provision is made for conveniently collecting and disposing of metal chips which result from a machining operation. To this end, the modified form of bed 255 is provided with a chip trough disposed to receive the chips falling from the table 22 and saddle 23, and comprising a pair of oppositely converging ends (not shown) and a pair of oppositely converging sides 515 and 516 which terminate in the central opening 248, as shown in Figs. 7 and 14. Chips falling through the opening 248 are collected in a chip receiving pan or container 517 removably positioned in the bed 255 beneath the opening. To dispose of accumulated chips, the pan may be slidably removed from the bed 255 of the machine.

Although the illustrative embodiments of the invention have been described in detail in order to fully disclose the manner in which the invention may be practiced, it is to be understood that the particular apparatuses set forth are intended to be illustrative only and that the various novel features of the invention may be incorporated in other structural forms without departing from the spirit and scope of the invention, as defined in the subjoined claims.

The principles of the invention having now been fully explained in connection with embodying structures, I hereby claim as my invention:

1. A machine tool comprising a frame, a spindle quill slidably mounted in said frame, a spindle rotatably mounted in said quill, a belt pulley rotatably mounted in said frame and operatively connected to drive said spindle, a speed changing transmission mechanism movably mounted in said frame for adjustment toward or from said spindle pulley, a pulley carried by said transmission mechanism in cooperative relationship with said spindle pulley, a belt operatively interconnecting said pulleys, means to adjust the position of said movable transmission mechanism for regulating the tension in said belt, adjustable rate changing mechanism operatively connected to effect feeding movements of said spindle quill, and an extensible power transmitting connection arranged between said transmission mechanism and said rate changing mechanism, whereby power may be delivered to said rate changing mechanism from said movable transmission mechanism regardless of its position in adjusting said belt.

2. In a machine tool, a frame, a driven member provided with a belt pulley mounted in said frame, a speed changing transmission mechanism provided with a belt pulley movably mounted in said frame, a belt interconnecting said pulleys, means to move said transmission mechanism to adjust the tension in said belt, a variable speed mechanism operatively connected to drive said transmission mechanism, speed adjusting and indicating means mounted in said frame, mechanism operatively connecting said speed adjusting means with said movable speed changing transmission mechanism for actuating it, and control linkage operatively connecting said speed adjusting means with said variable speed mechanism for adjusting it, whereby said speed changing and variable speed mechanisms may be adjusted cooperatively by said speed adjusting and indicating means regardless of the position of said speed changing mechanism in adjusting said belt.

3. In a machine tool comprising a frame, a spindle quill slidably mounted in said frame, a spindle rotatably mounted in said quill, a belt pulley rotatably mounted in said frame and operatively connected to drive said spindle, rate changing gear mechanism mounted in said frame and operatively connected to effect feeding movements of said spindle quill at selected feed rates, an electric motor mounted in said frame, driving mechanism operatively connecting said motor to actuate said quill at rapid traverse rate, a speed changing transmission mechanism movably mounted in said frame, a belt pulley mounted on and driven by said transmission mechanism is cooperating relationship with said spindle driving belt pulley, a belt operatively interconnecting said belt pulleys, means to move said transmission mechanism toward or from said spindle pulley to adjust the tension of said belt, an extensible power transmitting device disposed to connect said movable transmission mechanism to tighten said belt, a variable speed belt drive mechanism operatively connected to drive said transmission mechanism in adjusting said belt, and a source of power operatively connected to drive said transmission mechanism.

4. In a machine tool, a frame, a spindle rotatably mounted in said frame, a belt pulley operatively connected to drive said spindle, a speed changing shiftable gear mechanism movably mounted in said frame, a belt pulley driven by said mechanism and carried thereby in position to cooperate with said spindle driving pulley, a belt interconnecting said belt pulleys, means to move said transmission mechanism in said frame to tighten said belt, a variable speed belt driven mechanism operatively connected to drive said transmission mechanism, and speed adjusting control means including manually actuatable control levers and cooperating speed indicating means operatively connected to adjust said shiftable gear mechanism and said variable speed belt drive mechanism cooperatively.

5. In a machine tool, a frame, an axially movable spindle quill slidably mounted in said frame, a spindle rotatably mounted in said quill, mechanism connected to effect axial movement of said spindle, an electric motor connectible selectively to said mechanism for actuating it at rapid traverse rate, a feed rate changing mechanism operatively connected to said quill moving mechanism to move it at a selected feed rate, a belt pulley operatively connected to said spindle, a spindle driving speed changing mechanism movably mounted in said frame, a belt pulley mounted on and driven by said speed changing mechanism, a belt operatively interconnecting said belt pulleys, apparatus arranged to move said speed changing mechanism in said frame to adjust the tension of said belt, an extensible driving connection arranged to transmit power from said speed changing mechanism to said feed rate changing mechanism to drive it, and a source of power operatively connected to drive said speed changing mechanism.

6. In a machine tool, a frame, a driven member movably mounted in said frame, a gear changing transmission mechanism operatively connected to drive said driven movable member, a variable speed belt driving mechanism operatively connected to drive said gear changing mechanism, adjusting mechanism including a movable speed indicating dial operatively connected to adjust said gear changing mechanism, and regulating apparatus including a speed indicating pointer operating in conjunction with said dial and operatively connected to adjust said variable speed belt mechanism, the arrangement being such that said dial and pointer cooperate to indicate the speed of said driven member resulting from the adjustment of both said mechanisms.

7. In a machine tool, a driven member, a source of power for actuating said driven member, a belt pulley driven by said source of power, a movably mounted expansible pulley, a belt interconnecting said pulleys, a speed changing gear mechanism connected to be driven by said movably mounted pulley and connected to drive said driven member, and a speed selecting mechanism including a speed indicating dial, said mechanism being operatively connected to effect coordinated adjustment of said movable expansible pulley and said gear mechanism.

8. In a machine tool, a frame, a spindle rotatably mounted in said frame, a gear shifting change speed mechanism operatively connected to drive said spindle, a variable speed belt drive mechanism operatively connected to drive said change speed mechanism, and a single speed control device operatively connected to shift said gear shifting change speed mechanism and to adjust said variable speed belt drive mechanism cooperatively.

9. In a machine tool having a frame, a spindle mounted for axial and rotary movement in said frame, a belt pulley rotatably mounted in said frame and operatively connected to rotate said spindle, a speed changing transmission mechanism movably mounted in said frame, a belt pulley rotatably mounted on and driven by said transmission mechanism, a belt interconnecting said belt pulleys for driving said spindle from said transmission mechanism the arrangement being such that said belt may be tightened by moving said transmission mechanism in said frame, a rate changing transmission mechanism mounted in said frame and operatively connected to effect axial feeding movement of said spindle, an extensible power transmitting connection between said movable speed changing transmission mechanism and said rate changing transmission mechanism, a variable speed belt drive mechanism including a movably mounted expansible pulley connected to drive said speed changing transmission mechanism, and a speed selecting mechanism including a speed indicating dial operatively connected to effect and indicate coordinated adjustment of said movable expansible pulley and said speed changing transmission mechanism.

10. In a machine tool, a frame, a speed changing transmission mechanism movably mounted in said frame, a spindle carrying head mounted on said frame, a hollow spindle quill slidably mounted in said head, a belt pulley rotatably mounted in said head in coaxial alignment with said quill, a hollow shaft connected to said belt pulley and extending within said hollow quill, an anti-friction bearing mounted on said hollow shaft and slidably mounted within said quill to support said shaft therein, a tool spindle rotatably mounted in said quill, and a shaft projecting inwardly of said quill from said spindle and having splined connection with said hollow shaft in manner to maintain a driving connection between said pulley and said spindle regardless of axial adjustment of said quill and without requiring the driving shaft to project through the pulley, a second pulley mounted on and driven by said speed changing transmission mechanism, a driving belt operatively interconnecting said pulleys, and adjusting means arranged to effect movement of said transmission mechanism for regulating the tension in said belt.

11. A machine tool comprising a frame, a work support carried by said frame, a spindle rotatably supported in said frame, a belt pulley rotatably mounted in said frame and operatively connected to drive said spindle, a speed changing transmission mechanism movably mounted in said frame for adjustment toward or from said spindle pulley, a pulley carried by said transmission mechanism in cooperative relationship with said spindle pulley, a belt operatively interconnecting said pulleys, means to adjust the position of said movable transmission mechanism for regulating the tension in said belt, adjustable rate changing mechanism mounted in said frame and operatively connected to effect relative feeding movements between said spindle and said work support, and an extensible power transmitting connection arranged between said transmission mechanism and said rate changing mechanism, whereby power may be delivered to said rate changing mechanism from said movable transmission mechanism regardless of its position in adjusting said belt.

12. In a machine tool, a frame, a carriage movably mounted on said frame for reciprocatory movement in a linear path, a precision screw operatively arranged to effect movement of said carriage along said path, means operative to rotate said precision screw to effect carriage movement, a dial fixed to said screw and presenting indicia indicating linear displacement of said carriage in fractional units of measurement as effected by partial rotation of said screw, and a counter operatively connected to be driven by said screw and presenting indicia indicating linear displacement of said carriage in whole units of measurement as effected by successive rotations of said screw, whereby the position of said carriage may be ascertained by referring to said counter and said dial for whole and fractional units of measurement respectively indicating the total displacement from an initial position.

13. In a machine tool, a frame, a work support mounted on said frame, a spindle rotatably carried in said frame, mechanism operatively connected to effect relative feeding movement between said work support and said spindle, a belt pulley operatively connected to said spindle, a spindle driving speed changing mechanism movably mounted in said frame, a belt pulley mounted on and driven by said speed changing mechanism, a belt operatively interconnecting said belt pulleys, apparatus arranged to move said speed changing mechanism in said fame to adjust the tension of said belt, an extensible driving connection arranged to transmit power from said movable speed changing mechanism to said feeding mechanism to drive it, and a source of power operatively connected to drive said speed changing mechanism.

14. In a machine tool, a frame, a spindle quill slidably mounted in said frame, a spindle rotatably mounted in said quill, means to rotate said spindle, means to effect axial feeding movement of said spindle including a screw and nut actuating mechanism connected to move said quill, a reversing mechanism operatively connected to drive said screw and nut mechanism in either direction selectively, power feeding mechanism for actuating said reversing mechanism at feed rate, an overrunning clutch operatively connecting said power feeding mechanism to said reversing mechanism, an electric motor connected to drive said reversing mechanism at rapid traverse rate, a control lever connected to actuate said reverse mechanism, and control means on said control lever connected to energize said electric motor selectively, whereby said quill and spindle may be moved at rapid traverse rate in either direction as required.

15. In a machine tool, the combination with a frame and movable tool supporting and work supporting elements movably retained on said frame, of a power source, a variable speed mechanism driven by said power source, a fixed step transmission operably driven from said mechanism and connected to drive said tool supporting element at various speeds provided by said mechanism and transmission, a second transmission operably connected to be driven by said first-mentioned transmission, and a feed drive means driven from said second transmission to feed said tool supporting element toward or from said work supporting element at a feed rate in direct relation to the rotative speed of said tool element.

16. In a machine tool, a base, a movable member slidably mounted on said base, a second movable member slidably mounted on said first-mentioned movable member, a tool retaining member slidably mounted for relative movement toward or from both of said movable members, a power source, a variable speed transmission driven from said source and connected to rotatably drive said tool member, and a second transmission driven from said variable speed transmission and connected to impart feeding movement to said tool member, whereby the rate of feed of said tool member may be predeterminately selected and retained for a desired rotative speed rate of said member.

17. In a vertical spindle boring machine, a column presenting a forwardly projecting head, a vertically disposed spindle quill slidably mounted in said head, a tool spindle rotatably mounted in said quill, a belt pulley rotatably mounted in said head and operatively connected to drive said spindle, a speed changing mechanism movably mounted in said column, a belt pulley mounted on and driven by said speed changing mechanism, a driving belt operatively interconnecting said belt pulleys, and adjusting apparatus operatively connected to effect movemet of said speed changing mechanism for regulating the tension of said belt.

18. In a machine tool, a frame, a spindle rotatably mounted in said frame, a speed changing transmission mechanism movably mounted in said frame, a source of power operatively connected to drive said transmission mechanism, a belt and pulley drive mechanism operatively connected to transmit power from said transmission mechanism to said spindle, and means to move said transmission mechanism relative to said frame in order to adjust said belt and pulley transmission mechanism.

19. In a machine tool, a frame, a spindle rotatably mounted in said frame, a belt pulley carried by said spindle, a variable speed power transmission mechanism movably mounted in said frame, a belt pulley carried by said mechanism in position to cooperate with said pulley on said spindle, a source of power operatively connected to drive said transmission mechanism, a belt operatively interconnecting said pulleys, and means to move said transmission mechanism in said frame in order to adjust said belt.

20. A transmission for a machine tool having a rotatable tool-retaining spindle operably mounted in an axially movable quill assembly and comprising a power source, an infinitely variable speed drive mechanism connected to said power source, a fixed-step gear drive mechanism connectibly driven by said infinitely variable speed drive mechanism, a power take-off from said gear drive mechanism, a fixed-step gear transmission connected to said power take-off and disposed to drive said quill at any selected feed rate, a second power take-off means from said gear drive mechanism, a belt driven pulley means interconnecting said second take-off means and the tool retaining spindle whereby the quill assembly is fed at a feed rate in direct relationship to the rotative spindle speed.

21. A machine tool transmission comprising a power source, an infinitely variable speed drive mechanism operably connected to said power source, a range change gear drive mechanism connected to said infinitely variable speed drive mechanism to provide an infinitely variable range of output speeds, a power take-off connected to said gear drive mechanism and utilized to drive a machine element at a selected feed rate, and a second power take-off connected to said gear drive mechanism and utilized to drive a machine element at a selected speed rate whereby the output from said gear drive mechanism may be varied in direct relationship to provide a relatively constant condition between the feed rate and speed rate.

22. In a machine tool power drive train, a rotatably driven member, a second driven member, a belt drive mechanism operably disposed to drive said rotatably driven member, a range change gear mechanism operably connected to said belt drive mechanism and to said second driven mechanism for effecting movement of said second driven mechanism at a predetermined rate relative to the rate of rotation of said rotatably driven member, an infinitely variable drive mechanism operatively disposed to drive said range change gear mechanism, and a power source connected to drive said infinitely variable drive mechanism.

23. A transmission mechanism disposed to effect power rotation of a machine tool element and power movement of a machine tool element and comprising, a power source, an infinitely variable drive mechanism operably driven from said power source, a fixed step gear mechanism driven from said infinitely variable drive mechanism, a power take-off from said gear mechanism to effect rotation of a machine element at any selected speed selectively determinable by said infinitely variable drive mechanism, and a second power take-off from said gear mechanism to effect selective movement of a machine element at a feed rate directly related to the speed rate as selectively determined by the adjustment of said infinitely variable drive mechanism.

24. A transmission mechanism for a machine tool comprising a power source, an infinitely variable speed change mechanism operatively driven from said power source said variable speed mechanism including a flexible belt drive to minimize vibration, a fixed step gear mechanism operably driven by said speed change mechanism, a driven member and a flexible belt drive from said gear mechanism to said driven member for reducing vibration and to provide an integrated variable speed power drive for the machine tool.

25. In a machine tool provided with a pair of relatively movable members, a threaded feed screw and a cooperating nut respectively associated with said members, and means for maintaining alignment between said cooperating screw and nut comprising gimbals securing said nut to its associated member for freely inclined pivotal movement in mutually transverse planes, said gimbals being arranged to provide for automatic lateral adjustment of said nut in mutually transverse planes whereby side thrust between said nut and screw is reduced to a minimum for lessening the resultant lateral deflection between the said relatively movable members.

26. In a machine tool provided with a column, a spindle head movably carried by said column for selective adjustment, a quill assembly slidably carried by said head for axial movement, a tool spindle journalled in one end of said quill assembly and having a reduced upper portion extending upwardly therein, a hollow driving shaft disposed to extend downwardly within said quill in telescoping engagement with the upwardly extending end of said spindle, a bearing slidably mounted for bodily movement within said quill disposed to rotatably support said hollow driving shaft in telescoping relationship therewith, an infinitely variable speed transmission mechanism operatively connected to drive said hollow spindle driving shaft at a selected rate of speed, reversible actuating mechanism operatively connected to effect selective bodily movement of said quill assembly, independently operable rate adjusting means including an overrunning clutch operatively interconnecting said variable speed mechanism and said reversible actuating means to effect selective bodily movement of said quill assembly at a rate directly proportionate to the speed of said tool spindle, a separate motor operatively connected to drive said reversing mechanism at rapid traverse rate, a reversing lever connected to actuate said reversing mechanism for effecting selective directional movement of said quill at a predetermined adjusted rate of travel, and actuating means carried by said lever operatively connected to selectively actuate said separate motor for effecting movement of said quill at rapid traverse rate whenever said lever is moved to actuate said reversing mechanism and irrespective of whether or not said rate changing mechanism is functioning to drive said quill assembly at a predetermined adjusted rate of travel.

27. In a machine tool having a frame, a spindle head movably carried on said frame, a quill assembly slidably mounted in said head for selective axial movement, a self-compensating actuating mechanism disposed to effect selective axial movement of said quill assembly relative to said head, said actuating mechanism comprising a cooperating screw and nut mounted for relative lateral movement to obtain exact concentricity therebetween, a mounting apparatus for said nut including one intermediately movable member, said mounting apparatus being disposed to support said nut for universal pivotal movement and for lateral movement in mutually transverse planes, a combined unitary power source and variable speed transmission mechanism operatively connected to drive said spindle and effect relative movement of said quill at a feeding rate proportionate to the speed of said spindle, said combined power source and variable speed transmission mechanism being removably mounted in said frame in a manner to be removable therefrom as one unitary structure, and a combined indicating and control apparatus mounted in said frame and operatively connected to effect selective adjustment of said infinitely variable speed changing mechanism.

28. In a machine tool, a frame, a spindle head slidably carried by said frame for selective vertical adjustment, an axially movable spindle quill slidably mounted in said frame, a self-aligning elevating mechanism operatively connected to effect selective axial movement of said spindle quill, said elevating mechanism comprising a cooperating screw and nut mechanism so arranged that the said nut is carried for pivotal and lateral movement in two mutually transverse planes, a selectively energizable motor mounted in said frame and operatively connected to actuate said elevating mechanism for moving said quill at rapid traverse rate, an extensible driving connection operatively interconnecting said motor and said elevating mechanism for transmitting power therebetween regardless of the vertically adjusted position of said head, a feed rate changing mechanism connected to effect selective actuation of said elevating mechanism for moving said quill at a selected feeding rate, a speed changing transmission mechanism removably mounted in said frame and operatively connected to drive said spindle, said speed changing mechanism operatively connected to drive said feed rate changing mechanism for selectively driving said quill at a feeding rate proportionate to the rotational speed of said spindle, and an extensible driving connection operatively arranged to transmit power from said speed changing transmission mechanism to drive said spindle and to drive said feed rate changing mechanism regardless of the vertically adjusted position of said head along said column.

29. In a machine tool provided with a pair of relatively movable members, means for effecting relative movement between said members including a screw associated with one of said members and a cooperating nut associated with the other of said members, said cooperating screw and nut being threadedly engaged and disposed to cooperate for effecting a precisely predetermined linear displacement of one of said members relative to the other of said members, and means for effecting automatic alignment between said cooperating screw and nut including a gimbaled mounted apparatus disposed to interconnect said nut with its said associated member, said mounting apparatus comprising a carrier arranged to support said nut for pivotal and laterally slidable movement on one axis, said carrier, in turn, being supported by the said member associated therewith for pivotal and laterally slidable movement on a transverse axis whereby said elevating screw nut is supported for pivotal and laterally slidable movement in mutually transverse planes in a manner to be automatically retained in alignment with the said elevating screw.

30. A transmission mechanism for a machine tool comprising a power source, an infinitely variable speed changing mechanism operatively connected to be driven by said power source, a resilient drive interconnecting said power source and said speed changing mechanism, a fixed step range changing mechanism operatively connected to be driven by said speed changing mechanism, a rotatably driven member operatively connected to be driven by said range changing mechanism, a resilient drive interconnecting said range changing mechanism and said rotatably driven member, a bodily movable carrier disposed to support said rotatably driven member, reversing mechanism connected to effect selective directional movement of said carrier, and independently operable rate adjusting means operatively connected to transmit power from said range changing mechanism to drive said reversing mechanism whereby said carrier is moved at a rate of travel directly proportionate to the speed of said rotatably driven member.

31. In a machine tool, a frame, a speed changing transmission mechanism mounted in said frame, a spindle carrying head mounted on said frame, a hollow spindle quill slidably mounted in said head, a belt pulley rotatably mounted in said head in coaxial alignment with said quill, a hollow shaft connected to said belt pulley and extending within said quill, an anti-friction bearing mounted on said shaft and slidably mounted within said quill to support said shaft therein, a tool spindle rotatably mounted in said quill, a shaft projecting inwardly of said quill from said spindle and having driving engagement with said hollow shaft in a manner to maintain a driving connection between said pulley and said spindle regardless of the axial adjustment of said quill, a second pulley driven by said speed changing transmission mechanism, a belt operatively connected to transmit driving power between said pulleys, a self-aligning elevating mechanism operatively connected to effect selective axial movement of said quill relative to said head and comprising a cooperating screw and nut, gimbals disposed to support said nut for freely inclined pivotal movement in mutually transverse planes, said gimbals being arranged to allow lateral movement of said nut in mutually transverse planes, and a power transmitting mechanism including a feed rate changer operatively connected to transmit power from said speed changing mechanism to drive said elevating mechanism for moving said quill at a feed rate proportionate to the rotational speed of said spindle.

32. A transmission mechanism for a machine tool comprising a power source, an infinitely variable speed changing mechanism operatively connected to be driven by said power source, a resilient drive interconnecting said power source and said speed changing mechanism, a fixed-step range changing mechanism operatively connected to be driven by said speed changing mechanism, a driven member disposed to be driven by said range changing mechanism, and a resilient drive operatively interconnected between said range change mechanism and said driven member to provide an integrated variable speed power drive for the said machine tool.

33. In a feeding mechanism for a machine tool, an actuating mechanism comprising a cooperating screw and nut, a self-aligning apparatus for said actuating mechanism comprising a gimbaled mounting apparatus for said nut, said gimbaled mounting apparatus being disposed to support said nut for freely inclined universal pivotal movement and for lateral movement in mutually transverse planes, a reversing mechanism operatively connected to drive said screw and nut actuating mechanism in either direction selectively, power feeding mechanism selectively connectible to drive said reversing mechanism, an overrunning clutch operatively interconnected between said power feeding mechanism and said reversing mechanism, an electric motor operatively connected to drive said reversing mechanism at rapid traverse rate, a control lever connected to actuate said reversing mechanism for effecting selective directional movement of said actuating mechanism, and control means on said control lever connected to energize said motor selectively for effectively driving said reversing mechanism at rapid traverse rate in either direction.

34. In a machine tool, a spindle carrying head, a hollow spindle quill slidably mounted in said head for axial adjustment, a hollow driving shaft rotatably mounted in said head arranged to project into said hollow quill, a spindle rotatably mounted in said quill for axial movement therewith, said spindle extending into and having splined connection with said hollow driving shaft, an actuating mechanism comprising a threaded screw and a cooperating nut operatively connected to effect selective axial movement of said quill relative to said head, and a self-aligning apparatus for said screw and nut actuating mechanism comprising gimbals disposed to support said nut for universal pivotal movement and for lateral movement in mutually transverse planes.

35. In a machine tool provided with a column, a spindle head movably carried by said column for selective adjustment, a quill assembly slidably carried by said head for axial movement, a tool spindle journalled in one end of said quill assembly and having a reduced upper portion extending upwardly therein, a hollow driving shaft disposed to extend downwardly within said quill in telescoping engagement with the upwardly extending end of said spindle, a bearing slidably mounted for bodily movement within said quill disposed to rotatably support said hollow driving shaft in telescoping relationship therewith, an infinitely variable speed transmission mechanism operatively connected to drive said hollow spindle driving shaft at a selected rate of speed, reversible actuating mechanism operatively connected to effect selective bodily movement of said quill assembly, and independently operable rate adjusting means including an overrunning clutch operatively interconnecting said variable speed mechanism and said reversible actuating means to effect selective bodily movement of said quill assembly at a rate directly proportionate to the speed of said tool spindle.

36. In a machine tool, a hollow frame, a driven member movably mounted in said frame, a main drive mechanism operatively connected to drive said driven member, said main drive mechanism comprising a power source, an infinitely variable speed changer, and a range changer operatively connected in series to provide a continuous sequence of infinitely adjustable spindle speeds without discontinuity or overlapping therebetween, a movable carriage slidably supported by said frame and disposed to support said main drive mechanism for selective movement to an operating position within said hollow frame or to a non-operating position outside of said frame, adjusting mechanism including a movable speed indicating dial operatively connected to adjust the said range changer, and regulating apparatus including a speed indicating pointer operatively connected to adjust said infinitely variable speed changer, the arrangement being such that said dial and pointer cooperate to indicate the speed of said driven member resulting from the coordinated adjustment of said range changer and said speed changer.

37. In a boring machine, a frame provided with spaced vertical guideways and having a forwardly extending upper portion disposed to overlie said guideways, a supporting head provided with complementary guideways arranged to slidably engage the said guideways formed on said frame, a selectively actuatable screw and nut mechanism interconnecting said head and the said forwardly projecting upper portion of said frame in order that the said head is suspended for selective movement relative to said frame, said screw and nut mechanism being so disposed relative to said frame guideways that said head is balanced for self-aligning vertical adjustment therealong, a quill assembly slidably carried by said head for independent axial adjustment, a tool spindle rotatably journalled in said quill, an infinitely variable speed changing mechanism operatively connected to drive said spindle at a selected rate of speed, and an independently operable rate changing mechanism operatively arranged to transmit power from said infinitely variable speed changing mechanism to drive said quill at a rate of travel proportionate to the rotational speed of said spindle.

38. In a machine tool having a frame, a support member movably carried by said frame for selective rectilinear movement, a rotatable element journalled in said support member, a combined unitary power source and infinitely adjustable speed changing mechanism connected in series and operatively arranged to effect rotatable movement of said element and rectilinear movement of said supporting member, and a rate changer operatively interposed between said support member and the said combined unitary power source and speed changing mechanism whereby said supporting member and said rotatable element may be coordinately operated at predeterminately proportitioned rates of travel.

39. In a machine tool provided with a hollow frame, a spindle supporting head carried by said frame, a quill assembly movably carried by said head for axial adjustment, a tool spindle journalled in said spindle head, a combined power source and variable speed mechanism operatively connected in series to effect selective axial movement of said quill assembly and to effect selective rotational movement of said tool spindle, and a supporting carriage movably carried within said frame in a manner to support said combined power source and variable speed mechanism for selective movement to an operating position within said hollow frame or to a non-operating position outside of said frame to facilitate adjustment of said mechanism.

40. In a machine tool, a hollow frame, a driven member carried by said frame, a main drive mechanism operatively connected to drive said driven member at a selected speed, said main drive mechanism comprising a pludrality of separate independent units including a power source, an infinitely variable speed changer, and a fixed step range changer operatively connected to provide a continuous sequence of infinitely adjusted output speeds, a base member disposed to support said units comprising said main drive mechanism in a manner to constitute one coordinately operable and unitary structure, the said units comprising said main drive mechanism being removably secured to said support member in a manner to be individually replaceable thereon, and a plurality of guide members secured to said base plate in spaced parallelism and slidably supported within said frame in a manner that said main drive mechanism may be selectively moved from an operating position within said frame to a non-operating position outside of said frame in order to facilitate the adjustment of one or another of the said units comprising said mechanism.

41. In a machine tool, a frame, a quill assembly slidably carried by said frame for selective axial movement, a spindle rotatably mounted in said quill assembly, a belt pulley operatively connected to drive said spindle, a range changing transmission mechanism movably mounted in said frame, a belt pulley driven by said mechanism and carried thereby in position to cooperate with said spindle driving pulley, a belt interconnecting said belt pulleys, means to move said range changing mechanism in said frame to tighten said belt, an infinitely variable speed changing mechanism operatively connected to drive said range changing mechanism, speed adjusting control measn operatively connected to effect a coordinated adjustment of said range changing nism, and independently operable rate changing mechanism operatively connected to transmit power from said range changing mechanism to effect selective axial movement of said quill assembly at a rate of movement proportionate to the rotational speed of said spindle.

42. In a boring machine, a rotatable tool spindle, an axially movable quill disposed to rotatably support said tool spindle, a hollow frame arranged to support said quill for axial movement, a screw and nut mechanism operatively arranged to effect selective axial movement of said quill relative to said frame, a main drive mechanism operatively connected to drive said tool spindle and the said screw and nut mechanism for effecting coordinated operation of said spindle and said quill at predeterminately proportioned rates of travel, said main drive mechanism comprising a power source, an infinitely variable speed changer, and a fixed step range changer operatively connected in series in manner to cooperate for producing a continuous sequence of infinitely variable speeds without discontinuity or overlapping therebetween, a carriage movably supported by said frame arranged in turn to support said main drive mechanism for movement to an operating position within said frame or to a non-operating position outside of said frame whereby the units comprising said main driving mechanism and including said power source, said speed changer and said fixed step range changer may be quickly removed from said frame for any adjustment that may be necessary.

43. In a machine tool, a rotatable member carried for bodily axial movement, means for effecting selective axial movement of said member including a rate changer, means for effecting rotative movement of said member including an infinitely variable speed adjusting mechanism, said mechanism being connected to drive said rate changer for effecting axial movement of said member at a rate of travel predeterminately proportionate to the rotational speed of said member, a motor disposed to drive said variable speed mechanism, and a pair of resilient driving members respectively disposed to operatively interconnect said variable speed mechanism with said driven member and said motor in a manner to protect said mechanism against shock loads imposed by the momentary cessation in the movement of said member.

44. In a machine tool provided with a pair of relatively movable members, a threaded feed screw journalled in one of said members, a cooperating feed nut associated with the other of said members in a manner to operatively engage said feed screw, and a movable support bracket securing said nut to the said member associated therewith, said support bracket being pivotally and laterally movable in mutually transverse planes and being adapted to support said nut in longitudinally fixed relationship relative to said screw.

45. In a machine tool provided with a pair of relatively movable members, a screw element and a cooperating nut element comprising an axially extensible actuating mechanism operatively interconnected between said members for effecting relative movement therebetween, and a movable mounting bracket operatively connected between one of said elements and the one of said members respectively associated therewith, said movable mounting bracket comprising a gimbaled apparatus adapted to support the said element associated therewith for pivotal movement and for lateral movement in mutually transverse planes.

46. In a machine tool provided with a pair of relatively movable members, a feed screw element and a cooperating feed nut element operatively interconnecting said members, said feed elements being carried for relative rotation, movable self-aligning mounting means comprising gimbals securing one of said feed elements to the said member associated therewith, said mounting means being adapted to preclude misalignment between said feed elements, and means for relatively rotating said feed elements to effect relative movement between said members.

47. In a machine tool, a pair of relatively movable members, a screw element and a cooperating nut element comprising an axially extensible actuating mechanism operatively interconnecting said members to effect relative movement therebetween, said screw element and said nut element being carried for relative rotational movement, and a support bracket movably interconnecting one of said elements with the one of said members respectively associated therewith, said support bracket being pivotally movable and laterally movable in mutually transverse planes.

48. In a machine tool, a power source, a slidable support, a rotatable member journalled in said support, a variable feed transmission driven by said power source connectible to effect slidable movement of said support at a selected rate, and a variable speed mechanism connected to effect rotational movement of said member at a selected rate.

49. In a machine tool, a power source, a movable member carried for rotational and axial movement, a transmission driven by said power source connected to effect selective rotational movement of said member, and a second transmission driven by said power source connected to effect selective axial movement of said member.

50. In a machine tool, a power source, a movable member carried for rotational movement and for selective axial feeding movement, a variable speed transmission driven by said power source connectible to rotate said member at a selected speed rate, a variable feed mechanism driven by said power source connected to effect axial feeding movement of said member at a selected feeding rate, and a high speed motor connectible to drive said member at a faster rate of axial movement independently of said variable feed mechanism.

51. In a machine tool provided with a column, a spindle head movably carried by said column for selective vertical adjustment, a quill assembly slidably carried by said head for axial movement, a tool spindle journalled in one end of said quill assembly and having a reduced upper portion extending upwardly therein, a hollow driving shaft extending downwardly within said quill in axially movable telescoping engagement with the upper end of said spindle, a bearing slidably mounted for bodily movement within said quill arranged to rotatably support said hollow driving shaft in any axially adjusted position of said quill, and power operable means connected to drive said driving shaft for driving said tool spindle.

52. In a machine tool provided with a hollow column, tool supporting means movably carried by said column, work supporting means movably carried by said column, a rotatable drive shaft carried in said column selectively connectible to drive said work supporting means and said tool supporting means, a platform movably supported within said column in position to be moved outwardly through an opening formed in said column, variable speed transmission means including a power source carried by said platform in an operating postion within said column and being movable therewith to a position outwardly of said column, power transmitting means operatively driven by said transmission and being disconnectably engaged to drive said shaft, and a speed selecting mechanism carried by said column disconnectably engaged to selectively adjust said variable speed transmission.

53. In a machine tool, a frame provided with spaced vertical guideways and having a forwardly extending upper portion disposed to overlie said guideways, a spindle head provided with complementary guideways arranged to slidably engage the guideways formed on said frame, a selectively actuatable screw and nut mechanism operatively interconnecting said head and the said forwardly projecting upper portion of said frame in a manner that said spindle head is suspended for selective vertical adjustment, said screw and nut mechanism being so disposed relative to said frame guideways that said head is balanced for self-aligning vertical adjustment therealong, and means connected to selectively actuate said screw and nut mechanism for effecting selective vertical movement of said spindle head.

References Cited in the file of this patent

UNITED STATES PATENTS

| Number | Name | Date |
|---|---|---|
| 1,303,089 | McCarty | May 6, 1919 |
| 1,611,042 | Johnston et al. | Dec. 14, 1926 |
| 1,777,603 | Cockburn et al. | Oct. 7, 1930 |
| 2,212,406 | Rusnak | Aug. 20, 1940 |
| 2,251,016 | Gallimore | July 29, 1941 |
| 2,262,512 | Musselman | Nov. 11, 1941 |
| 2,389,757 | Bickel | Nov. 25, 1945 |
| 2,489,725 | Rutemiller | Nov. 29, 1949 |